United States Patent
Wariishi et al.

(10) Patent No.: US 6,902,850 B2
(45) Date of Patent: Jun. 7, 2005

(54) ELECTROLYTE COMPOSITION, METHOD FOR PRODUCING THE SAME AND NON-AQUEOUS ELECTROLYTE SECONDARY CELL

(75) Inventors: Koji Wariishi, Kanagawa (JP); Takayasu Yasuda, Kanagawa (JP); Takeshi Senga, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 633 days.

(21) Appl. No.: 10/080,067

(22) Filed: Feb. 22, 2002

(65) Prior Publication Data

US 2002/0155354 A1 Oct. 24, 2002

(30) Foreign Application Priority Data

Feb. 22, 2001 (JP) .................................. 2001-046723
Mar. 29, 2001 (JP) .................................. 2001-097417

(51) Int. Cl.[7] .......................... H01M 6/18; H01M 6/04
(52) U.S. Cl. ........................ 429/317; 429/188; 429/313
(58) Field of Search ........................ 429/313, 317, 429/306, 129, 188, 323, 345, 312, 213, 314, 218.1, 303, 307, 308, 144, 33; 252/62.2, 299.61, 512; 136/263; 29/623.5; 525/331.9

(56) References Cited

U.S. PATENT DOCUMENTS 4,798,773 A * 1/1989 Yasukawa et al. .......... 429/313
5,362,493 A * 11/1994 Skotheim et al. ........... 429/313

* cited by examiner

Primary Examiner—Bruce F. Bell
Assistant Examiner—Robert Hodge
(74) Attorney, Agent, or Firm—Sughrue Mion, PLLC

(57) ABSTRACT

An electrolyte composition that contains a molten salt having a specific structure, a silicon polymer, and a salt of a metal ion of Group 1 or 2 of the Periodic Table; and a non-aqueous electrolyte secondary cell containing the electrolyte composition. Also disclosed are an electrolyte composition that contains a polymer compound having repetitive units of a structure of the following formula (1), and a salt of a metal ion of Group 1 or 2 of the Periodic Table; a method for producing the electrolyte composition; and a non-aqueous electrolyte secondary cell containing the electrolyte composition.

General formula (1)

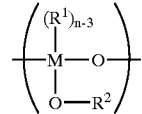

12 Claims, 2 Drawing Sheets

ELECTROLYTE COMPOSITION, METHOD FOR PRODUCING THE SAME AND NON-AQUEOUS ELECTROLYTE SECONDARY CELL

BACKGROUND OF THE INVENTION

1. Field of the Invention

The present invention relates to an electrolyte composition, and more precisely, to one favorable for materials for antistatic agents, batteries and other electrochemical devices and to a method for producing the same, as well as to non-aqueous electrolyte secondary cells of high capacity and good cycle stability.

2. Description of the Related Art

An electrolyte to be used in electrochemical cells such as non-aqueous secondary cells is a medium that contains ions in accordance with its objects and has the function of transporting the ions to electrodes (this is referred to as ionic conduction). For example, in a lithium secondary cell, one typical example of non-aqueous secondary cells, the transport of lithium ions is a key characteristic.

In such cells, in general, much used is a solution-type electrolyte of high ionic conductivity, which, however, is often problematic in that, when it is sealed in cells, its solvent is exhausted or leaks out to lower the durability of the cells. Another problem with it is that, since the electrolytic solution is sealed in cells, the cells require metallic casings, and, as a result, the cell weight increases and the cell structure latitude is difficult to broaden.

To overcome the drawbacks of such solution-type electrolytes, various electrolytes of other types have been proposed these days. A gel electrolyte prepared by infiltrating a solution-type electrolyte into a polymer matrix (for example, as in R. Koksbang et al., *Solid State Ionics*, 69, 320, 1994) is comparable to the solution-type electrolyte as its ionic conductivity lowers little and it does not interfere with cell capabilities. However, it is still problematic in that it could not completely prevent the solvent vaporization.

Also to overcome the drawbacks of solution-type electrolytes, proposed is a solid electrolyte (polyelectrolyte). For example, it is expected that a polyelectrolyte comprising a salt dissolved in a polymer such as polyethylene oxide will solve the problems with solution-type electrolytes. However, the polyelectrolyte of this type is still problematic in that its ionic conductivity is insufficient.

One problem with most polyelectrolytes that have heretofore been proposed in the art is that their ability to transport ions is generally poor. The ion transport is one important property of electrolytes. For example, in lithium secondary cells comprising a polyelectrolyte, the lithium ion transport by the polyelectrolyte is low. Therefore, the lithium secondary cells of this type are problematic in that the charge-discharge current through them decreases in time and the cell capacity is low. For these reasons, the cells could not be built in all-purpose devices.

On the other hand, imidazolium salts and pyridinium salts having a counter anion of $BF_4^-$, $(CF_3SO_2)_2N^-$ or the like are room-temperature fusible salts that are liquid at room temperature, and they are proposed for electrolytes for lithium ion cells. Though their ionic conductivity is high, however, they still have some problems. One is that their ability to transport lithium ions in cells is often low. In this connection, the ion transport is one important property of electrolyte as so mentioned in the above. Another is that, since they are liquid, they will leak out of cells.

SUMMARY OF THE INVENTION

The present invention is to solve the problems in the related art noted above and to attain the objects mentioned below. Specifically, the objects of the invention are to provide an excellent novel electrolyte composition of low or no fluidity that ensures high ionic conduction and ion transport, and a method for producing it, and to provide a non-aqueous electrolyte secondary cell having the advantage of high cell capacity not lowering in time and the advantage of good cycle stability.

Taking the above-mentioned objects into consideration, we, the present inventors have assiduously studied and, as a result, have found that an electrolyte composition comprising a polymer compound having repetitive units of a structure of a general formula (1) mentioned below and a salt of a metal ion of Group 1 or 2 of the Periodic Table, and an electrolyte composition comprising a molten salt, a silicon polymer, and a salt of a metal ion of Group 1 (Ia) or 2 (IIa) of the Periodic Table have excellent charge transportability and durability. On the basis of these findings, the inventors have reached the present invention. In addition, the inventors have completed a non-aqueous electrolyte secondary cell comprising the electrolyte composition.

Specifically, the present invention that attains the objects as above encompasses the following aspects.

The first aspect of the present invention is an electrolyte composition comprising a polymer compound having repetitive units of a structure of the following general formula (1) and a salt of a metal ion of Group 1 or 2 of the Periodic Table:

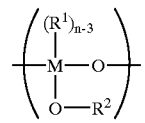

General formula (1)

wherein $R^1$ represents one of a substituted or unsubstituted alkyl group and a substituted or unsubstituted alkoxy group; $R^2$ represents a substituted or unsubstituted alkyl group; at least one of $R^1$ and O—$R^2$ is a substituent containing an alkoxycarbonyl group; M represents a silicon, boron or metal element; and n indicates the valence of M.

The second aspect of the present invention is the electrolyte composition subsidiary to the first aspect thereof, in which M in general formula (1) represents silicon.

The third aspect of the present invention is the electrolyte composition subsidiary to the first aspect thereof, in which $R^1$ in general formula (1) represents a substituted or unsubstituted alkoxy group.

The fourth aspect of the present invention is the electrolyte composition subsidiary to the first aspect thereof, in which the polymer compound comprises a product prepared by reacting a compound of the following general formula (2), with a hydroxyl group-having carboxylic acid:

$$(R^1)M(OR^3)_{n-1}$$

General formula (2)

wherein $R^1$ represents one of a substituted or unsubstituted alkyl group and a substituted or unsubstituted alkoxy group; M represents a silicon, boron or metal element; n indicates the valence of the element M; and $R^3$ represents a substituted or unsubstituted alkyl group.

The fifth aspect of the present invention is the electrolyte composition subsidiary to the fourth aspect thereof, in which the hydroxyl group-having carboxylic acid is represented by the following general formula (3):

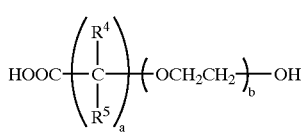

General formula (3)

wherein $R^4$ and $R^5$ each independently represent a hydrogen atom or an alkyl group; a represents an integer of from 1 to 5; and b represents an integer of from 0 to 30.

The sixth aspect of the present invention is the electrolyte composition subsidiary to the fifth aspect thereof, in which, in general formula (3), a is 1, and b is 0.

The seventh aspect of the present invention is the electrolyte composition subsidiary to the fifth aspect thereof, in which $R^4$ and $R^5$ in general formula (3) each represent a hydrogen atoms.

The eighth aspect of the present invention is the electrolyte composition subsidiary to the first aspect thereof, in which the polymer compound comprises a product prepared by reacting a polymer compound that includes repetitive units of a structure of the following general formula (4), with an alkoxycarbonyl group-having alcohol compound:

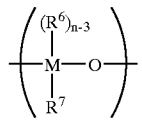

General formula (4)

wherein $R^6$ represents one of a substituted or unsubstituted alkyl group and a substituted or unsubstituted alkoxy group; $R^7$ represents a substituted or unsubstituted alkoxy group; M represents silicon, boron or a metal element; and n represents the valence of M.

The ninth aspect of the present invention is the electrolyte composition subsidiary to the eighth aspect thereof, in which the alkoxycarbonyl group-having alcohol compound comprises an alkoxycarbonyl group-having alcohol compound represented by the following general formula (5):

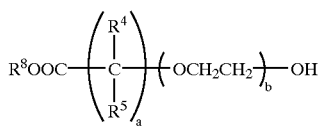

General formula (5)

wherein $R^8$ represents a substituted or unsubstituted alkyl group; $R^4$ and $R^5$ each independently represent a hydrogen atom or an alkyl group; a represents an integer from 1 to 5; and b represents an integer from 0 to 30.

The tenth aspect of the present invention is the electrolyte composition subsidiary to the ninth aspect thereof, in which, in general formula (5), a is 1 and b is 0.

The eleventh aspect of the present invention is the electrolyte composition subsidiary to the ninth aspect thereof, in which $R^4$ and $R^5$ in general formula (5) each represent hydrogen atoms.

The twelfth aspect of the present invention is the electrolyte composition subsidiary to the first aspect thereof, which has been crosslinked by reacting with a compound having at least two nucleophilic groups in the molecule.

The thirteenth aspect of the present invention is the electrolyte composition subsidiary to the twelfth aspect thereof, for which the nucleophilic group of the compound is a hydroxide group.

The fourteenth aspect of the present invention is an electrolyte composition comprising a molten salt, a silicon polymer, and a salt of a metal ion of Group 1 or 2 of the Periodic Table.

The fifteenth aspect of the present invention is the electrolyte composition subsidiary to the fourteenth aspect thereof, in which the molten salt is represented by any of the following general formulae (6), (7) and (8):

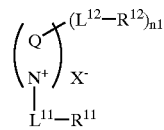

General formula (6)

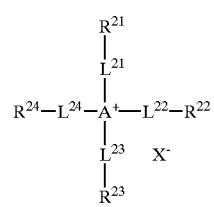

General formula (7)

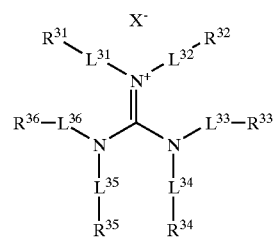

General formula (8)

In general formula (6), Q represents an atomic group capable of forming a 5-membered or 6-membered aromatic cation along with the nitrogen atom in the formula; $L^{11}$ and $L^{12}$ each independently represent a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups; $R^{11}$ represents a hydrogen atom or a substituent; $R^{12}$ represents a hydrogen atom or a substituent; n1 is an integer of 0, 1 or more, not exceeding the maximum number of ($L^{12}$-$R^{12}$) groups substitutable on Q; $X^-$ represents an anion; when n1 is 2 or more, ($L^{12}$-$R^{12}$) groups may be the same or different; and at least two of $R^{11}$ and $R^{12}$'s may be bonded to each other to form a cyclic structure;

In general formula (7), $L^{21}$, $L^{22}$, $L^{23}$ and $L^{24}$ have the same meaning as $L^{11}$ in general formula (6); $R^{21}$, $R^{22}$, $R^{23}$ and $R^{24}$ each independently represent a hydrogen atom or a substituent; at least two of $R^{21}$, $R^{22}$, $R^{23}$ and $R^{24}$ may be bonded to each other to form a cyclic structure; and A represents a nitrogen or phosphorus atom; and In general formula (8), $L^{31}$ to $L^{36}$ have the same meaning as $L^{11}$ in general formula (6); $R^{31}$ to $R^{36}$ each independently represent a hydrogen atom or a substituent; and at least two of $R^{31}$ to $R^{36}$ may be bonded to each other to form a cyclic structure.

The sixteenth aspect of the present invention is the electrolyte composition subsidiary to the fifteenth aspect thereof, in which Q in general formula (6) is an atomic group composed of at least one of carbon, hydrogen, nitrogen, oxygen and sulfur atoms.

The seventeenth aspect of the present invention is the electrolyte composition subsidiary to the fifteenth aspect thereof, in which the 5-membered or 6-membered aromatic cation to be formed by Q along with the nitrogen atom in general formula (6) is an imidazolium or pyridinium cation.

The eighteenth aspect of the present invention is the electrolyte composition subsidiary to the fifteenth aspect thereof, in which the molten salt of general formula (6) is represented by the following general formula (9):

General formula (9)

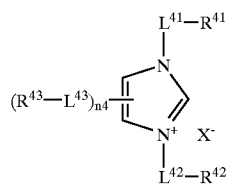

wherein $L^{41}$, $L^{42}$ and $L^{43}$ each independently represent a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups; $R^{41}$, $R^{42}$ and $R^{43}$ each independently represent a hydrogen atom or a substituent; n4 is an integer of from 0 to 3; $X^-$ represents an anion; when n4 is 2 or 3, ($R^{43}$-$L^{43}$) groups may be the same or different; and at least two of $R^{41}$, $R^{42}$ and $R^{43}$ may be bonded to each other to form a cyclic structure.

The nineteenth aspect of the present invention is the electrolyte composition subsidiary to the fifteenth aspect thereof, in which the molten salt of general formula (6) is represented by the following general formula (10):

General formula (10)

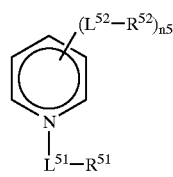

wherein $L^{51}$ and $L^{52}$ each independently represent a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups; $R^{51}$ and $R^{52}$ each independently represent a hydrogen atom or a substituent; n5 is an integer of from 0 to 5; $X^-$ represents an anion; when n5 is 2 or more, ($L^{52}$-$R^{52}$) groups may be the same or different; and at least two of $R^{51}$ and $R^{52}$'s may be bonded to each other to form a cyclic structure.

The twentieth aspect of the present invention is the electrolyte composition subsidiary to the fourteenth aspect thereof, in which the silicon polymer has repetitive units of a structure of the following general formula (11):

General formula (11)

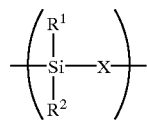

wherein $R^1$ and $R^2$ each independently represent an alkyl group, an alkoxy group, an aryl group, or an aryloxy group; and X represents an atomic group comprising an oxygen atom, a nitrogen atom, an alkylene group, a phenylene group, a silicon atom, a metal atom, or a combination thereof.

The twenty-first aspect of the present invention is the electrolyte composition subsidiary to the twentieth aspect thereof, in which the silicon polymer having repetitive units of the structure of general formula (11) has repetitive units of a structure of the following general formula (12):

General formula (12)

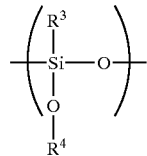

wherein $R^3$ represents an alkyl group, an alkoxy group, an aryl group, or an aryloxy group; and $R^4$ represents an alkyl group or an aryl group.

The twenty-second aspect of the present invention is the electrolyte composition subsidiary to the twenty-first aspect thereof, in which $R^3$ in general formula (12) is an alkoxy group.

The twenty-third aspect of the present invention is the electrolyte composition subsidiary to the twenty-first aspect thereof, in which at least one of $R^3$ and $OR^4$ in general formula (12) has an alkoxycarbonyl group for its substituent.

The twenty-fourth aspect of the present invention is the electrolyte composition subsidiary to the twenty-first aspect thereof, in which the silicon polymer having repetitive units of the structure of general formula (12) is a product prepared by reacting a compound of the following general formula (13), with a hydroxyl group-having carboxylic acid:

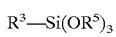

$R^3$—Si(OR$^5$)$_3$            General formula (13)

wherein $R^3$ has the same meaning as in general formula (12); and $R^5$ represents a substituted or unsubstituted alkyl group, or a substituted or unsubstituted aryl group.

The twenty-fifth aspect of the present invention is the electrolyte composition subsidiary to the twenty-fourth aspect thereof, in which the hydroxyl group-having carboxylic acid is represented by the following general formula (14):

General formula (14)

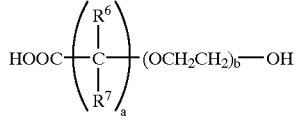

wherein $R^6$ and $R^7$ each independently represent a hydrogen atom or an alkyl group; a indicates an integer of from 1 to 5; and b indicates an integer of from 0 to 30.

The twenty-sixth aspect of the present invention is the electrolyte composition subsidiary to the twenty-first aspect thereof, in which the silicon polymer having repetitive units of the structure of general formula (12) is a product prepared by reacting a silicon polymer having repetitive units of a structure of the following general formula (15), with an alcohol compound:

General formula (15)

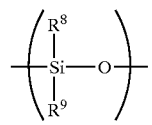

wherein $R^8$ has the same meaning as $R^3$ in general formula (12); and $R^9$ represents an alkoxy group.

The twenty-seventh aspect of the present invention is the electrolyte composition subsidiary to the twenty-sixth aspect thereof, in which the alcohol compound has an alkoxycarbonyl group for its substituent.

The twenty-eighth aspect of the present invention is the electrolyte composition subsidiary to the twenty-seventh aspect thereof, in which the alcohol compound is represented by the following general formula (16):

General formula (16)

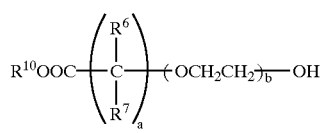

wherein $R^{10}$ has the same meaning as $R^5$ in general formula (13).

The twenty-ninth aspect of the present invention is the electrolyte composition subsidiary to the twenty-first aspect thereof, which is reacted with a compound having at least two nucleophilic groups in the molecule.

The present invention also provides a method for producing the electrolyte composition as above. The first aspect of the production method of the present invention comprises a step of preparing a polymer compound having repetitive units of a structure of the following general formula (1), and a step of adding a salt of a metal ion of Group 1 or 2 of the Periodic Table to the polymer compound to produce an electrolyte composition, in which the step of preparing the polymer compound comprises reacting a compound of the following general formula (2) with a hydroxyl group-having carboxylic acid:

General formula (1)

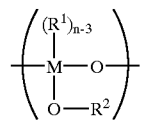

wherein $R^1$ represents a substituted or unsubstituted alkyl group, or a substituted or unsubstituted alkoxy group; $R^2$ represents a substituted or unsubstituted alkyl group; at least one of $R^1$ and O—$R^2$ is a substituent containing an alkoxycarbonyl group; M represents a silicon, boron or metal element; and n indicates the valence of M, and

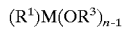  General formula (2)

wherein $R^1$ represents one of a substituted or unsubstituted alkyl group and a substituted or unsubstituted alkoxy group; M represents a silicon, boron or metal element; n indicates the valence of the element M; and $R^3$ represents a substituted or unsubstituted alkyl group.

The second aspect of the production method of the present invention comprises a step of preparing a polymer compound having repetitive units of a structure of the following general formula (1), and a step of adding a salt of a metal ion of Group 1 or 2 of the Periodic Table to the polymer compound to produce an electrolyte composition, in which the step of preparing the polymer compound comprises reacting a polymer compound having repetitive units of a structure of the following general formula (4), with an alkoxycarbonyl group-having alcohol compound:

General formula (1)

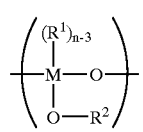

wherein $R^1$ represents a substituted or unsubstituted alkyl group, or a substituted or unsubstituted alkoxy group; $R^2$ represents a substituted or unsubstituted alkyl group; at least one of $R^1$ and O—$R^2$ is a substituent containing an alkoxycarbonyl group; M represents a silicon, boron or metal element; and n indicates the valence of M, and General formula (4)

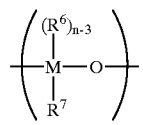

wherein $R^6$ represents one of a substituted or unsubstituted alkyl group and a substituted or unsubstituted alkoxy group; $R^7$ represents a substituted or unsubstituted alkoxy group; M represents silicon, boron or a metal element; and n represents the valence of M.

The present invention further provides a non-aqueous electrolyte secondary cell. The first aspect of the non-aqueous electrolyte secondary cell of the present invention comprises a positive electrode and a negative electrode, and contains the electrolyte composition of the first aspect of the present invention.

The second aspect of the non-aqueous electrolyte secondary cell of the present invention comprises a positive electrode and a negative electrode, and contains the electrolyte composition of the fourteenth aspect of the present invention.

BRIEF DESCRIPTION OF THE DRAWINGS

In FIG. 1, 1 indicates a cell casing that serves as a negative electrode terminal; 2 indicates a coiled electrode group; 3 indicates an upper insulating plate; 4 indicates a positive electrode lead; 5 indicates a gasket; 6 indicates a cell cover that serves as a positive electrode terminal; 61 indicates a pressure sensor valve; 62 indicates a current block device (switch); and 63 indicates a PTC device.

In FIG. 2, 21 indicates a positive electrode sheet; 22 indicates a solid electrolyte; 23 indicates a negative electrode sheet; 24 indicates a positive electrode terminal; and 25 indicates a negative electrode terminal.

DESCRIPTION OF THE PREFERRED EMBODIMENTS

Figure 1:
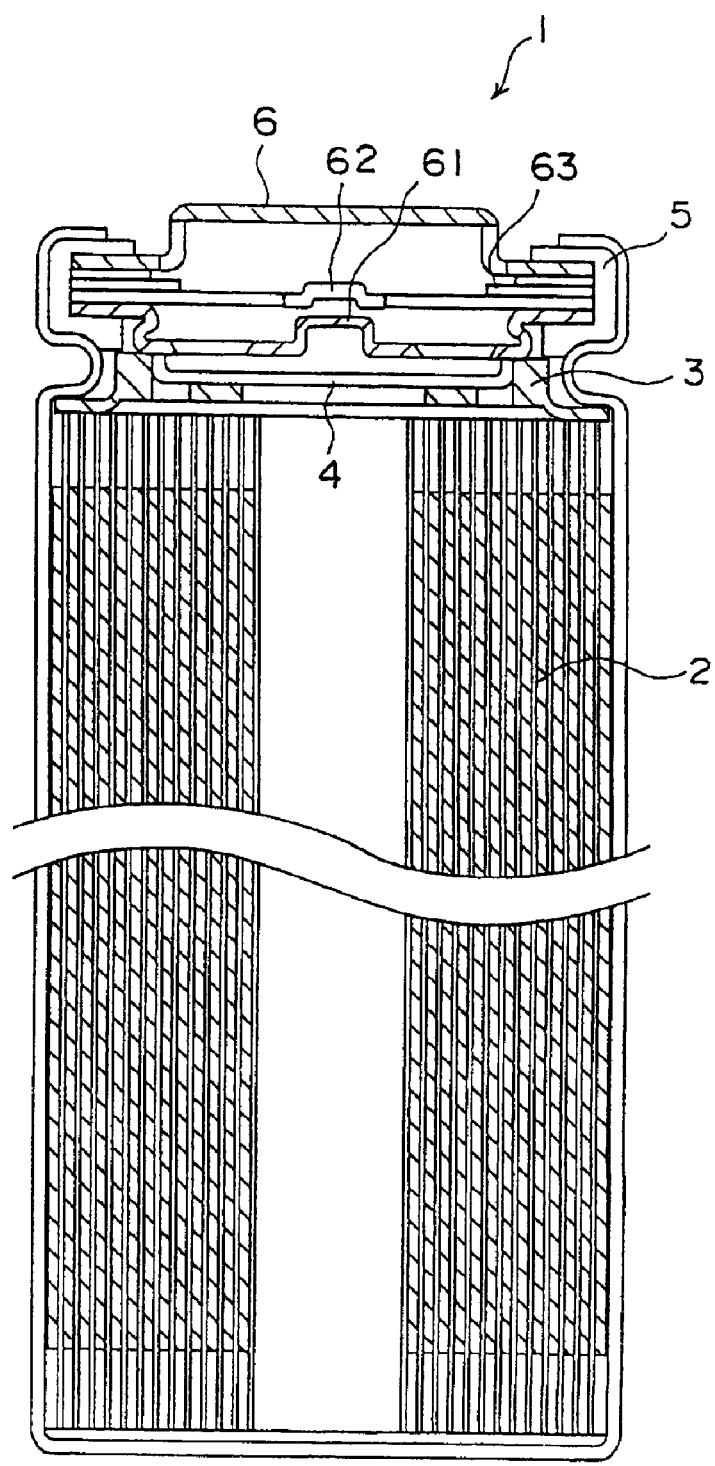
FIG. 1 shows a cross-sectional view of a cylinder cell fabricated in Examples herein.

The electrolyte composition and its production method, and the non-aqueous electrolyte secondary cell of the present invention are described hereinunder. First described in detail is the electrolyte composition of the present invention.

Electrolyte Composition and Its Production Method:

The electrolyte composition of the present invention has many applications, for example, for reaction solvents for chemical reaction, metal plating and the like, and for CCD (charge-coupled device) cameras, various types of cells, and photoelectric conversion devices, and is especially favorable for lithium secondary cells.

The first aspect of the electrolyte composition of the present invention is characterized in that it contains a polymer compound having repetitive units of a structure of general formula (1) mentioned below and a salt of a metal ion of Group 1 (Ia) or 2 (IIa) of the Periodic Table.

<Polymer Compound>

The polymer compound having repetitive units of a structure of the following general formula (1) for use in the present invention is described:

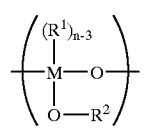

General formula (1)

wherein $R^1$ represents a substituted or unsubstituted alkyl group, or a substituted or unsubstituted alkoxy group; $R^2$ represents a substituted or unsubstituted alkyl group; at least one of $R^1$ and $O$—$R^2$ is a substituent containing an alkoxycarbonyl group; M represents a silicon, boron or metal element; and n indicates the valence of M.

In general formula (1), M is a silicon, boron or metal element. Preferred examples of the metal element for M are titanium, aluminium, zirconium, germanium, iron, gallium, phosphorus, tin and vanadium.

Apart from these, also usable herein are the metal elements referred to in *Science of Sol-Gel Process* (by Sumio Sakka, Agune Shofu-Sha, 1988) for the materials in the sol-gel process.

Of those mentioned above, preferred for M are silicon, boron, titanium and aluminium; and more preferred is silicon.

In general formula (1), n indicates the valance of the element M.

In general formula (1), $R^1$ is a substituted or unsubstituted alkyl group, or a substituted or unsubstituted alkoxy group.

The alkyl group for $R^1$ preferably has from 1 to 8 carbon atoms, more preferably from 1 to 4 carbon atoms. Even more preferably, the alkyl group is any of methyl, ethyl, propyl, n-butyl and t-butyl groups.

The alkoxy group for $R^1$ preferably has from 1 to 8 carbon atoms, more preferably from 1 to 4 carbon atoms. Even more preferably, the alkoxy group is any of methoxy, ethoxy, propoxy, n-butoxy and t-butoxy groups.

For $R^1$, more preferred is an alkoxy group.

In general formula (1), $R^2$ is a substituted or unsubstituted alkyl group. The meaning of the alkyl group for $R^2$ is the same as that of the alkyl group for $R^1$.

The alkyl group for $R^1$ and $R^2$, and the alkoxy group for $R^1$ may be unsubstituted or substituted.

Preferred examples of the substituent for these are mentioned below.

For example, the substituent includes a halogen atom, an alkyl group, an aryl group, a heterocyclic group, a cyano group, a nitro group, an alkoxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, an alkyl or arylsulfinyl group, an alkyl or arylsulfonyl group, an acyl group, an aryloxycarbonyl group, an alkoxycarbonyl group, a carbamoyl group, and a silyl group.

Preferred examples of the halogen atom are chlorine, bromine and iodine atoms.

The alkyl group may be a linear, branched or cyclic alkyl group, and its preferred examples are methyl, ethyl, n-propyl, isopropyl, t-butyl, n-octyl, eicosyl, 2-chloroethyl, 2-cyanoethyl, 2-ethylhexyl, cyclohexyl, cyclopentyl and 4-n-dodecylcyclohexyl groups.

Preferred examples of the aryl group are phenyl, p-tolyl, naphthyl and m-chlorophenyl groups.

Preferred examples of the heterocyclic group are monovalent groups derived from 5-membered or 6-membered, substituted or unsubstituted, aromatic or non-aromatic heterocyclic compounds by removing one hydrogen atom from them. More preferred are, for example, 2-furyl, 2-thienyl, 2-pyrimidinyl and 2-benzothiazolyl groups.

Preferred examples of the alkoxy group are methoxy, ethoxy, isopropoxy, t-butoxy, n-octyloxy and 2-methoxyethoxy groups, and —$O(CH_2CH_2O)_nCH_3$.

Preferred examples of the silyloxy group are trimethylsilyloxy, t-butyldimethylsilyloxy and trimethoxysilyloxy groups.

Preferred examples of the acyloxy group are formyloxy, acetyloxy, pivaloyloxy, stearoyloxy, benzoyloxy and p-methoxyphenylcabonyloxy groups.

Preferred examples of the carbamoyloxy group are N,N-dimethylcarbamoyloxy, N,N-diethylcarbamoyloxy, morpholinocarbonyloxy, N,N-di-n-octylaminocarbonyloxy and N-n-octylcarbamoyloxy groups.

Preferred examples of the alkoxycarbonyloxy group are methoxycarbonyloxy, ethoxycarbonyloxy, t-butoxycarbonyloxy and n-octylcarbonyloxy groups.

Preferred examples of the aryloxycarbonyloxy group are phenoxycarbonyloxy, p-methoxyphenoxycarbonyloxy and p-n-hexadecyloxyphenoxycarbonyloxy groups.

Preferred examples of the amino group are amino, methylamino, dimethylamino, anilino, N-methyl-anilino and diphenylamino groups.

Preferred examples of the acylamino group are formylamino, acetylamino, pivaloylamino, lauroylamino, benzoylamino and 3,4,5-tri-n-octyloxyphenylcarbonylamino groups.

Preferred examples of the aminocarbonylamino group are carbamoylamino, N,N-dimethylaminocarbonylamino, N,N-diethylaminocarbonylamino and morpholinocarbonylamino groups.

Preferred examples of the alkoxycarbonylamino group are methoxycarbonylamino, ethoxycarbonylamino, t-butoxycarbonylamino, n-octadecyloxycarbonylamino and N-methyl-methoxycarbonylamino groups.

Preferred examples of the aryloxycarbonylamino group are phenoxycarbonylamino, p-chlorophenoxycarbonylamino and m-n-octyloxyphenoxycarbonylamino groups.

Preferred examples of the sulfamoylamino group are sulfamoylamino, N,N-dimethylaminosulfonylamino and N-n-octylaminosulfonylamino groups.

Preferred examples of the alkyl or arylsulfonylamino group are methylsulfonylamino, butylsulfonylamino, phenylsulfonylamino, 2,3,5-trichlorophenylsulfonylamino and p-methylphenylsulfonylamino groups.

Preferred examples of the alkylthio group are methylthio, ethylthio and n-hexadecylthio groups.

Preferred examples of the arylthio group are phenylthio, p-chlorophenylthio and m-methoxyphenylthio groups.

The heterocyclic-thio group is preferably a substituted or unsubstituted heterocyclic-thio group having from 2 to 30 carbon atoms. More preferred are, for example, 2-benzothiazolylthio and 1-phenyltetrazol-5-ylthio groups.

Preferred examples of the sulfamoyl group are N-ethylsulfamoyl, N-(3-dodecyloxypropyl)sulfamoyl, N,N-dimethylsulfamoyl, N-acetylsulfamoyl, N-benzoylsulfamoyl and N-(N'-phenylcarbamoyl)sulfamoyl groups.

Preferred examples of the alkyl or arylsulfinyl group are methylsulfinyl, ethylsulfinyl, phenylsulfinyl and p-methylphenylsulfinyl groups.

Preferred examples of the alkyl or arylsulfonyl group are methylsulfonyl, ethylsulfonyl, phenylsulfonyl and p-methylphenylsulfonyl groups.

Preferred examples of the acyl group are acetyl, pivaloyl, 2-chloroacetyl, stearoyl, benzoyl and p-n-octyloxyphenylcarbonyl groups.

Preferred examples of the aryloxycarbonyl group are phenoxycarbonyl, o-chlorophenoxycarbonyl, m-nitrophenoxycarbonyl and p-t-butylphenoxycarbonyl groups.

Preferred examples of the alkoxycarbonyl group are methoxycarbonyl, ethoxycarbonyl, t-butoxycarbonyl and n-octadecyloxycarbonyl groups.

Preferred examples of the carbamoyl group are carbamoyl, N-methylcarbamoyl, N,N-dimethylcarbamoyl, N,N-di-n-octylcarbamoyl and N-(methylsulfonyl)carbamoyl groups.

The silyl group is preferably a substituted or unsubstituted silyl group having from 3 to 30 carbon atoms. More preferred are, for example, trimethylsilyl, t-butyldimethylsilyl and phenyldimethylsilyl groups.

Specific examples (A-1 to A-10) of the repetitive units for the polymer compound having repetitive units of the structure of general formula (1) are shown below, to which, however, the present invention is not limited.

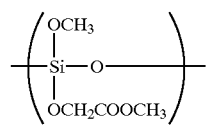
A-1

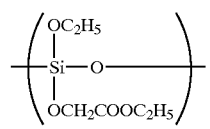
A-2

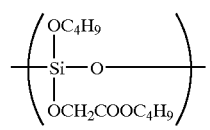
A-3

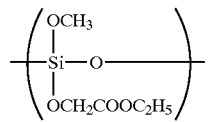
A-4

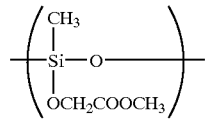
A-5

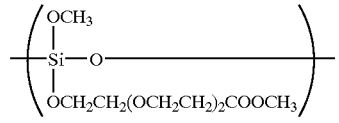
A-6

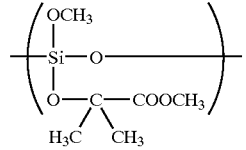
A-7

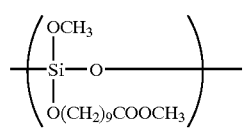
A-8

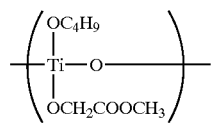
A-9

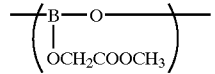
A-10

Preferably, the polymer compound having repetitive units of the structure of general formula (1) for use in the present invention is prepared by reacting a compound of the following general formula (2) with a hydroxyl group-having carboxylic acid:

$(R^1)M(OR^3)_{n-1}$         General formula (2)

wherein M represents a silicon, boron or metal element; n indicates the valence of the element M; and $R^3$ represents a substituted or unsubstituted alkyl group.

In general formula (2), M, n and $R^1$ have the same meanings as those in formula (1).

In general formula (2), $R^3$ is a substituted or unsubstituted alkyl group. The meaning of the alkyl group for $R^3$ is the same as that for $R^1$ in general formula (1).

Specific examples (2-1 to 2-11) of the compound of general formula (2) for use herein are mentioned below, to which, however, the present invention is not limited.

| | |
|---|---|
| $Si(OCH_3)_4$ | 2-1 |
| $Si(OC_2H_5)_4$ | 2-2 |
| $Si(OC_4H_9(n))_4$ | 2-3 |
| $CH_3Si(OCH_3)_3$ | 2-4 |
| $CH_3Si(OC_2H_5)_3$ | 2-5 |
| $(CH_3O)_2Si(OC_2H_5)_2$ | 2-6 |

 2-7

 2-8

 2-9

 2-10

 2-11

The hydroxyl group-having carboxylic acid is preferably represented by the following general formula (3):

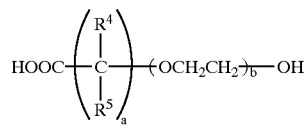

General formula (3)

wherein $R^4$ and $R^5$ each independently represent a hydrogen atom or an alkyl group. The meaning of the alkyl group for $R^4$ and $R^5$ is the same as that for $R^1$ in general formula (1).

Preferably, $R^4$ and $R^5$ are hydrogen atoms.

In general formula (3), a indicates an integer of from 1 to 5; and b indicates an integer of from 0 to 30. When a is 2 or more, $R^4$'s and $R^5$'s may be the same or different.

Preferably, a is 1, and b is 0.

Specific examples (3-1 to 3-10) of the hydroxyl group-having carboxylic acid and the compound of general formula (3) for use in the present invention are mentioned below, to which, however, the present invention is not limited.

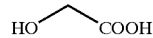 3-1

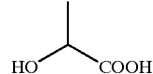 3-2

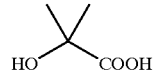 3-3

 3-4

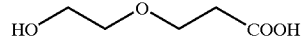 3-5

 3-6

 3-7

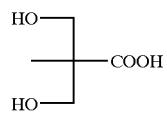 3-8

 3-9

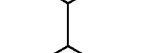

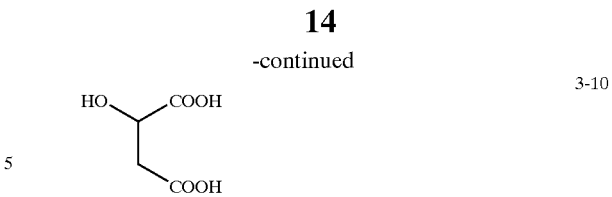 3-10

Also preferably, the polymer compound having repetitive units of the structure of general formula (1) is prepared by reacting a polymer compound having repetitive units of a structure of the following general formula (4), with an alcohol compound, more preferably with an alkoxycarbonyl group-having alcohol compound:

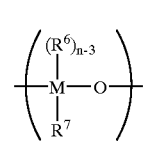

General formula (4)

wherein $R^6$ has the same meaning as $R^1$ in general formula (1); $R^7$ represents an alkoxy group;

The meaning of the alkoxy group for $R^6$ and $R^7$ is the same as that of the alkoxy group for $R^1$ in general formula (1).

M represents silicon, boron or a metal element; and n represents the valence of M.

Specific examples (4-1 to 4-5) of the polymer compound having repetitive units of the structure of general formula (4) for use in the present invention are mentioned below, to which, however, the present invention is not limited.

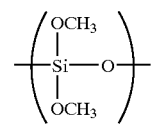 4-1

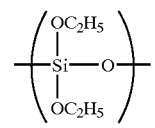 4-2

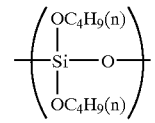 4-3

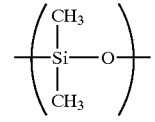 4-4

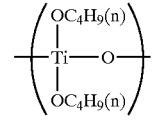 4-5

More preferably, the alkoxycarbonyl group-having alcohol compound is represented by the following general formula (5):

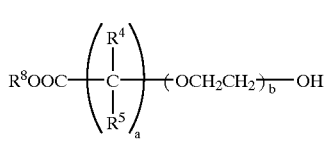

General formula (5)

wherein $R^8$ has the same meaning as $R^3$ in general formula (2); and $R^4$, $R^5$, a and b have the same meanings as those in general formula (3).

Preferably, in general formula (5), $R^4$ and $R^5$ are hydrogen atoms, a is 1, and b is 0.

Specific examples (5-1 to 5-13) of the alkoxycarbonyl group-having alcohol compound for use in the present invention are mentioned below, to which, however, the present invention is not limited.

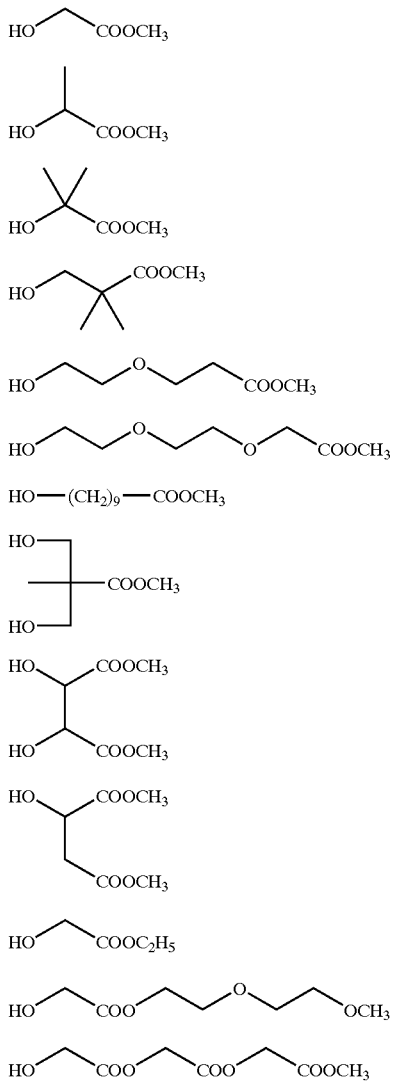

<Method for Producing Electrolyte Composition>

The first aspect of the method for producing the electrolyte composition of the present invention comprises a step of preparing a polymer compound having repetitive units of the structure of general formula (1), and a step of adding a salt of a metal ion of Group 1 (Ia) or 2 (IIa) of the Periodic Table to the polymer compound, in which the step of preparing the polymer compound comprises reacting the compound of general formula (2) with a hydroxyl group-having carboxylic acid such as that mentioned hereinabove.

The second aspect of the method for producing the electrolyte composition of the present invention comprises a step of preparing a polymer compound having repetitive units of the structure of general formula (1), and a step of adding a salt of a metal ion of Group 1 (Ia) or 2 (IIa) of the Periodic Table to the polymer compound, in which the step of preparing the polymer compound comprises reacting a polymer compound having repetitive units of the structure of general formula (4), with an alkoxycarbonyl group-having alcohol compound such as that mentioned hereinabove.

The reaction of the compound of general formula (2) with the hydroxyl group-having carboxylic acid (hereinafter referred to as "reaction A") and the reaction of the polymer compound having repetitive units of the structure of general formula (4) with the alkoxycarbonyl group-having alcohol compound (hereinafter referred to as "reaction B") may be effected in the presence or absence of a solvent, but is preferably effected not using a solvent, that is, in the absence of a solvent.

The reaction temperature for the reaction A and the reaction B preferably falls between room temperature and the reflux point of the reaction mixture.

The reaction time for the reaction A and the reaction B preferably falls between 30 minutes and 7 days, more preferably between 1 hour and 2 days.

For controlling the reaction speed, the reaction temperature and the reaction time are not limited to the above.

Preferably after the reaction A and the reaction B, the volatile components are evaporated away from the reaction product produced. For evaporating the volatile components, the reaction mixture is preferably heated under reduced pressure. Concretely, the reaction mixture is heated at 100° C. under a reduced pressure of 5 mmHg (667 Pa) until the weight loss of the reaction product reaches at most 50%, more preferably at most 30%.

In the method for producing the electrolyte composition of the present invention, the step of preparing a polymer compound having repetitive units of the structure of general formula (1) (reaction A or reaction B) and the step of adding a salt of a metal ion of Group 1 (Ia) or 2 (IIa) of the Periodic table to the polymer compound may be effected at the same time, or alternatively, the metal ion salt may be added thereto after the polymer has been prepared.

Concretely, the step of preparing the polymer compound (reaction A or reaction B) may be effected in the presence of a salt of a metal ion of Group 1 (Ia) or 2 (IIa) of the Periodic table; or alternatively, the metal ion salt may be added to the polymer compound already prepared.

In the step of the reaction A to prepare the polymer compound, the ratio of the hydroxyl group-having carboxylic acid ($A^2$) to the compound of general formula (2) ($A^1$), $A^2/A^1$ preferably falls between 0.1 and n (by mol), in which n has the same meaning as in general formula (1), more preferably between 0.2 and 2, even more preferably between 0.5 and 1.

In the step of the reaction B to prepare the polymer compound, the amount of the alkoxycarbonyl group-having alcohol compound ($B^1$) to be added thereto preferably falls between 1% by weight and 300% by weight, more preferably between 10% by weight and 200% by weight, even more preferably between 30% by weight and 150% by weight of the polymer compound having repetitive units of the structure of general formula (4) ($B^2$).

The electrolyte composition of the present invention may contain a solvent of which the amount is at most the same by weight of the polymer compound therein. From the viewpoint of storage stability thereof, however, the electrolyte composition does not contain a solvent.

The electrolyte composition of the present invention may be infiltrated into electrodes, for example, according to a method of dissolving it under heat, or a method of infiltrating it into electrodes optionally under reduced pressure, or a method of infiltrating it into electrodes along with a low-boiling-point solvent (e.g., methanol, acetonitrile, methylene chloride) followed by removing the solvent under heat, and the thus-processed electrodes may be built in cells.

The solvent for use in the electrolyte composition is preferably a compound of low viscosity capable of increasing the ionic mobility in the electrolyte composition containing it or a compound of high permittivity capable of increasing the effective carrier concentration therein, therefore being able to develop good ion conduction through the electrolyte composition containing it.

Preferred examples of the solvent of this type are carbonate compounds such as ethylene carbonate, propylene carbonate; heterocyclic compounds such as 3-methyl-2-oxazolidinone; ether compounds such as dioxane, diethyl ether; linear ethers such as ethylene glycol dialkyl ethers, propylene glycol dialkyl ethers, polyethylene glycol dialkyl ethers, polypropylene glycol dialkyl ethers; alcohols such as methanol, ethanol, ethylene glycol monoalkyl ethers, propylene glycol monoalkyl ethers, polyethylene glycol monoalkyl ethers, polypropylene glycol monoalkyl ethers; polyalcohols such as ethylene glycol, propylene glycol, polyethylene glycol, polypropylene glycol, glycerin; nitrile compounds such as acetonitrile, glutarodinitrile, methoxyacetonitrile, propionitrile, benzonitrile; esters such as carboxylates, phosphates, phosphonates; and aprotic polar substances such as dimethyl sulfoxide, sulforane.

Of those, especially preferred are carbonate compounds such as ethylene carbonate, propylene carbonate; heterocyclic compounds such as 3-methyl-2-oxazolidinone; nitrile compounds such as acetonitrile, glutarodinitrile, methoxyacetonitrile, propionitrile, benzonitrile; and esters.

One or more of these may be in the electrolyte composition, either singly or as combined.

Regarding their properties, it is desirable that the preferred solvents have a boiling point at ordinary pressure (1 atmosphere) of not lower than 200° C., more desirably not lower than 250° C., even more desirably not lower than 270° C., as they are non-volatile and therefore do not detract from the durability of cells.

<Salt of Metal Ion of Group 1 or 2 of the Periodic Table>

The salt of a metal ion of Group 1 (Ia) or 2 (IIa) of the Periodic Table to be in the first aspect of the electrolyte composition of the present invention is described.

The metal ion of Group 1 (Ia) or 2 (IIa) of the Periodic Table to be in the electrolyte composition of the present invention is preferably an ion of lithium, sodium or potassium. Typical examples of the salt of such a metal salt are $LiCF_3SO_3$, $LiPF_6$, $LiClO_4$, $LiI$, $LiBF_4$, $LiCF_3CO_2$, $LiSCN$, $LiN(SO_2CF_3)_2$, $NaI$, $NaCF_3SO_3$, $NaClO_4$, $NaBF_4$, $NaAsF_6$, $KCF_3SO_3$, $KSCN$, $KPF_6$, $KClO_4$, and $KAsF_6$.

Of the examples of the metal ion salt, more preferred are the Li salts.

One or more of the metal ion salts may be in the electrolyte composition, either singly or as combined. Preferably, the salt concentration in the electrolyte composition falls between 3% by weight and 300% by weight, more preferably between 5% by weight and 200% by weight of the polymer compound therein.

<Compound Having at Least Two Nucleophilic Groups in the Molecule>

The electrolyte composition of the first aspect of the present invention may be crosslinked and solidified through reaction of a compound having at least two nucleophilic groups in the molecule (the compound will be hereinafter referred to as "nucleating agent").

For preventing leakage and evaporation thereof through cells, the electrolyte composition is desirably solidified in the cells.

Preferable examples of the nucleophilic groups in the compound having two nucleophilic groups in the molecule include hydroxyl groups, amino groups, mercapto groups, sulfide groups, sulfino groups, and sulfinato groups. Of these, hydroxyl groups are particularly preferable.

Specific examples of the compound having two nucleophilic groups in the molecule are shown below (a to j). The present invention is not in any way limited by these examples.

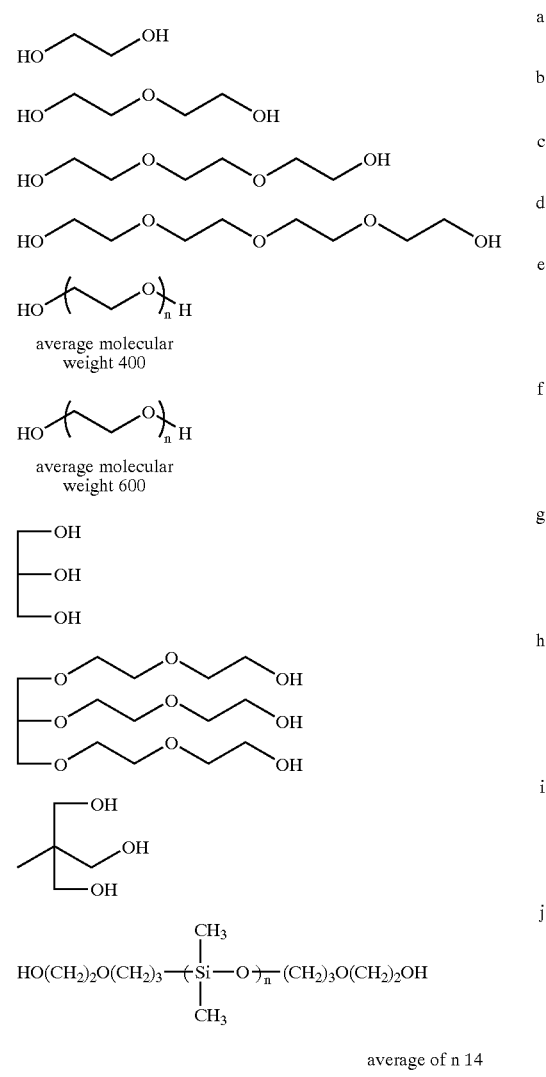

An addition amount of the compound having two nucleophilic groups in the molecule to be used is preferably from 0.1 to 70% by weight relative to total weight of the electrolyte composition, more preferably from 0.3 to 50%, and even more preferably from 0.5 to 30%.

A reaction temperature when the compound is added is preferably from 0° C. to 150° C., and more preferably from 10° C. to 100° C.

A reaction time when the compound is added is preferably from 5 minutes to 2 days, and more preferably from 10 minutes to 1 day.

Speed of the reaction is controlled by the reaction temperature and reaction time, and these are not limited by the above preferences.

The electrolyte composition of the first aspect of the present invention may be gelled (solidified), for example, through polymer addition thereto, oil-gelling agent addition thereto, polyfunctional monomer polymerization therein, or polymer crosslinking therein.

For gelling the electrolyte composition through polymer addition thereto, for example, employable are the compounds described in *Polymer Electrolyte Reviews 1 and 2* (by J. R. MacCallum and C. A. Vincent, ELSEVIER APPLIED SCIENCE). Especially preferred for it are polyacrylonitrile, polyvinylidene fluoride, polyethylene oxide and polysiloxane.

Compounds usable for gelling the electrolyte composition through oil-gelling agent addition thereto are described in journals of industrial science. For example, preferred for it are the compounds described in *J. Chem. Soc. Japan*, Ind. Chem. Soc., 46, 779 (1943); *J. Am. Chem. Soc.*, 111, 5542 (1989); *J. Chem. Soc., Chem. Commun.*, 1993, 390; *Angew. Chem. Int. Ed. Engl.*, 35, 1949 (1996); *Chem. Lett.*, 1996, 885; *J. Chem. Soc., Chem. Commun.*, 1997, 545. More preferred are compounds having an amido structure in the molecule.

The electrolyte composition of the second aspect of the present invention contains a molten salt, a silicon polymer, and a salt of a metal ion of Group 1 (Ia) or 2 (IIa) of the Periodic Table.

<Molten Salt>

The molten salt to be in the electrolyte composition of the second aspect of the present invention is described.

It is desirable that the salt to be in the electrolyte composition of the present invention has a low melting point, that is, the salt is a molten salt, as its ionic conductivity is high and its volatility is low. More preferably, the salt is a compound that is liquid at room temperature (around 25° C.), that is, the salt is a room-temperature molten salt.

The molten salt to be in the electrolyte composition is preferably a compound of any of the following general formulae (6), (7) and (8). Also preferably, the melting point of the compound is not higher than 100° C., more preferably not higher than 80° C., even more preferably not higher than 60° C.

General formula (6)

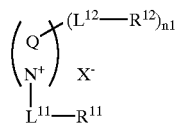

Feneral formula (7)

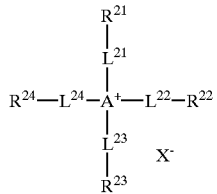

General formula (8)

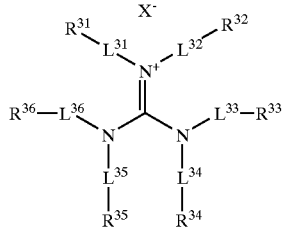

Compound of General Formula (6)

The compound of general formula (6) is described.

In general formula (6), Q represents an atomic group capable of forming a 5-membered or 6-membered aromatic cation along with the nitrogen atom in the formula. Preferably, Q is an atomic group composed of at least one of carbon, hydrogen, nitrogen, oxygen and sulfur atoms.

The 5-membered or 6-membered aromatic cation to be formed by Q along with the nitrogen atom in the formula is preferably an imidazolium or pyridinium cation.

The 5-membered ring to be formed by Q along with the nitrogen atom in the formula is preferably an oxazole ring, a thiazole ring, an imidazole ring, a pyrazole ring, an isoxazole ring, a thiadiazole ring, an oxadiazole ring or a triazole ring, more preferably a thiazole ring, a triazole ring or an imidazole ring, even more preferably an imidazole ring.

The 6-membered ring to be formed by Q along with the nitrogen atom in the formula is preferably a pyridine ring, a pyrimidine ring, a pyridazine ring, a pyrazine ring or a triazine ring, more preferably a pyridine ring.

In general formula (6), $L^{11}$ and $L^{12}$ each are a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups.

Examples of $L^{11}$ are methylene, ethylene, propylene, vinylene, propenylene, $-(CH_2CH_2O)_n-$, $-(CH_2CH_2O)_n-CH_2-$, $-(CH_3H_6O)_n-$, $-(CH_3H_6O)_n-CH_2-$, and their combinations. In these, n indicates an integer of from 1 to 20.

Of its examples as above, $L^{11}$ is more preferably methylene, ethylene, propylene, $-(CH_2CH_2O)_n-$, $-(CH_2CH_2O)_n-CH_2-$, $-(C_3H_6O)_n-$ or $-(C_3H_6O)_n-CH_2-$. Even more preferably, it is an alkylene group such as methylene, ethylene, propylene.

In general formula (6), $R^{11}$ is a hydrogen atom or a substituent; and $R^{12}$ is a hydrogen atom or a substituent.

The substituent for $R^{11}$ and $R^{12}$ includes, for example, an alkyl group, an alkenyl group, an aryl group, a silyl group, a silyloxy group, an alkoxy group, an amino group, an amido group, a guanidino group, a carbamoyl group, a cyano group, an alkylthio group, a heterocyclic group, and a halogen atom.

Preferred examples of the alkyl group are methyl, ethyl, propyl, isopropyl, cyclopropyl, butyl, octyl, 2-carboxyethyl and benzyl groups.

Preferred examples of the alkenyl group are vinyl, allyl and propenyl groups.

Preferred examples of the aryl group are phenyl and methoxyphenyl groups.

The silyl group may be substituted or unsubstituted, preferably having from 3 to 30 carbon atoms. More preferably, for example, it is trimethylsilyl, t-butyldimethylsilyl, phenyldimethylsilyl or $(Si(CH_3)_2O)_n Si(CH_3)_3$.

The silyloxy group preferably has from 3 to 20 carbon atoms. More preferably, for example, it is trimethylsilyloxy or t-butylsilyloxy.

Preferred examples of the alkoxy group are methoxy, ethoxy, $—(OCH_2CH_2)_n—OCH_3$, and $—(OCH_2CH_2)_n—OCH_2CH_3$.

Preferred examples of the amino group are dimethylamino and diethylamino groups.

Preferred examples of the amido group are acetylamino and benzoylamino groups.

Preferred examples of the carbamoyl group are N,N-dimethylcarbamoyl and N-phenylcarbamoyl groups.

Preferred examples of the alkylthio group are methylthio and ethylthio groups.

Preferred examples of the heterocyclic group are pyridyl and imidazolyl groups.

Preferred examples of the halogen atom are chlorine, bromine and iodine atoms.

Of the preferred examples of the substituent mentioned above, more preferred are an alkyl group, an alkenyl group, an aryl group, a silyl group, a silyloxy group, an alkoxy group, an amino group, a guanidino group, a cyano group, a heterocyclic group, and a halogen atom.

The preferred substituents may be further substituted. In the preferred examples of the substituent mentioned above, n indicates an integer of from 1 to 20.

In general formula (6), n1 is an integer of 0, 1 or more, not exceeding the maximum number of $(L^{12}-R^{12})$ groups substitutable on Q. Preferably, n1 is an integer falling between 0 and 2. When n1 is 2 or more, $(L^{12}-R^{12})$ groups may be the same or different.

In general formula (6), at least two of $R^{11}$ and $R^{12}$'s may be bonded to each other to form a cyclic structure. Preferably, the cyclic structure is a 5- to 7-membered ring, more preferably a 5- or 6-membered ring.

The compound of general formula (6) may form a polymer via $R^{11}$ and/or $R^{12}$ therein. The polymer is preferably a di- to tetra-mer, more preferably a dimer.

In general formula (6), $X^-$ is an anion.

Preferred examples of $X^-$ are $SCN^-$, $BF_4^-$, $PF_6^-$, $ClO_4^-$, $SbF_6^-$, $(CF_3SO_2)_2N^-$, $(CF_3CF_2SO_2)_2N^-$, $Ph_4B^-$, $(C_2H_4O_2)_2B^-$, $(CF_3SO_2)_3C^-$, $CF_3COO^-$, $CF_3SO_3^-$, and $C_6F_5SO_3^-$.

Of the preferred examples of $X^-$ as above, more preferred are $SCN^-$, $BF_4^-$, $PF_6^-$, $ClO_4^-$, $SbF_6^-$, $(CF_3SO_2)_2N^-$, $(CF_3CF_2SO_2)_2N^-$, $(CF_3SO_2)_3C^-$, and $CF_3SO_3^-$.

Of the compounds of general formula (6) preferred for the molten salt to be in the electrolyte composition of the present invention, more preferred are those of the following general formulae (9) and (10).

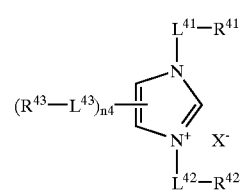

General formula (9)

In general formula (9), $L^{41}$, $L^{42}$ and $L^{43}$ each independently represent a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups; $R^{41}$, $R^{42}$ and $R^{43}$ each independently represent a hydrogen atom or a substituent; n4 is an integer of from 0 to 3; $X^-$ represents an anion; when n4 is 2 or 3, $(R^{43}-L^{43})$ groups may be the same or different; and at least two of $R^{41}$, $R^{42}$ and $R^{43}$ may be bonded to each other to form a cyclic structure.

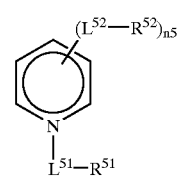

General formula (10)

In general formula (10), $L^{51}$ and $L^{52}$ each independently represent a substituted or unsubstituted alkylene group, a substituted or unsubstituted alkenylene group, a substituted or unsubstituted alkyleneoxy group or a divalent linking group formed of repetitions thereof, a substituted or unsubstituted alkenyleneoxy group or a divalent linking group formed of repetitions thereof, or a divalent linking group formed of a combination of a plurality of the groups; $R^{51}$ and $R^{52}$ each independently represent a hydrogen atom or a substituent; n5 is an integer of from 0 to 5; $X^-$ represents an anion; when n5 is 2 or more, $(L^{52}-R^{52})$ groups may be the same or different; and at least two of $R^{51}$ and $R^{52}$'s may be bonded to each other to form a cyclic structure.

Specific examples and preferred embodiments of $L^{41}$, $L^{42}$, $L^{43}$, $L^{51}$ and $L^{52}$ in general formulae (9) and (10) are the same as those of $L^{11}$ in general formula (6).

Specific examples and preferred embodiments of $R^{41}$, $R^{42}$, $R^{43}$, $R^{51}$ and $R^{52}$ in general formulae (9) and (10) are the same as those of $R^{11}$ in general formula (6).

In general formulae (9) and (10), $X^-$ has the same meaning as in general formula (6), and its preferred embodiments are also the same as those of $X^-$ therein.

At least two of $R^{41}$, $R^{42}$ and $R^{43}$ in general formula (9), and at least two of $R^{51}$ and $R^{52}$'s in general formula (10) may be bonded to each other to form a cyclic structure. The cyclic structure is preferably a 5- to 7-membered ring, more preferably a 5- or 6-membered ring.

Compound of General Formula (7), and Compound of General Formula (8)

The compound of general formula (7) mentioned below and the compound of general formula (8) mentioned below, which are preferred examples of the molten salt to be in the second aspect of the electrolyte composition of the present invention, are described:

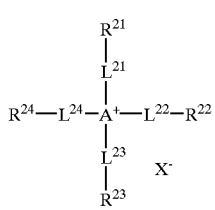

General formula (7)

wherein $L^{21}$, $L^{22}$, $L^{23}$ and $L^{24}$ have the same meaning as $L^{11}$ in general formula (6); $R^{21}$, $R^{22}$, $R^{23}$ and $R^{24}$ each are a hydrogen atom or a substituent; at least two of $R^{21}$, $R^{22}$, $R^{23}$ and $R^{24}$ may be bonded to each other to form a cyclic structure; and A represents a nitrogen or phosphorus atom, and

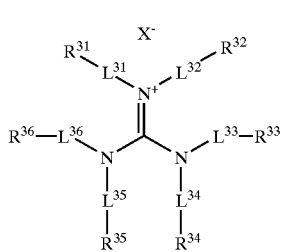

General formula (8)

wherein $L^{31}$ to $L^{36}$ have the same meaning as $L^{11}$ in general formula (6); $R^{31}$ to $R^{36}$ each are a hydrogen atom or a substituent; and at least two of $R^{31}$ to $R^{36}$ may be bonded to each other to form a cyclic structure.

In general formulae (7) and (8), specific examples and preferred embodiments of $L^{21}$, $L^{22}$, $L^{23}$, $L^{24}$, $L^{31}$, $L^{32}$, $L^{33}$, $L^{34}$, $L^{35}$ and $L^{36}$ are the same as those of $L^{11}$ in general formula (6).

In general formulae (7) and (8), specific examples and preferred embodiments of $R^{21}$, $R^{22}$, $R^{23}$, $R^{24}$, $R^{31}$, $R^{32}$, $R^{33}$, $R^{34}$, $R^{35}$ and $R^{36}$ are the same as those of $R^{11}$ in general formula (6).

In general formulae (7) and (8), $X^-$ has the same meaning as in general formula (6), and its preferred embodiments are also the same as those of $X^-$ therein.

At least two of $R^{21}$, $R^{22}$, $R^{23}$ and $R^{24}$ in general formula (7), and at least two of $R^{31}$, $R^{32}$, $R^{33}$, $R^{34}$, $R^{35}$ and $R^{36}$ in general formula (8) may be bonded to each other to form a cyclic structure. The cyclic structure is preferably a 5- to 7-membered ring, more preferably a 5- or 6-membered ring.

Specific examples (Y1 to Y29) of the compounds of general formulae (6), (7) and (8) for use herein are mentioned below, to which, however, the present invention is not limited.

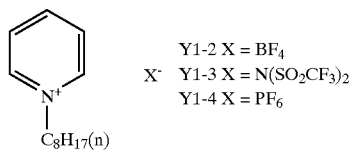

(Y1)

Y1-2 X = BF$_4$
Y1-3 X = N(SO$_2$CF$_3$)$_2$
Y1-4 X = PF$_6$

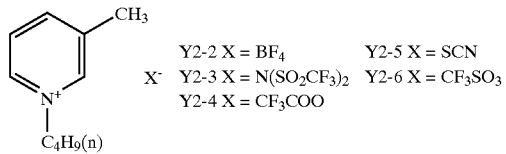

(Y2)

Y2-2 X = BF$_4$  Y2-5 X = SCN
Y2-3 X = N(SO$_2$CF$_3$)$_2$  Y2-6 X = CF$_3$SO$_3$
Y2-4 X = CF$_3$COO

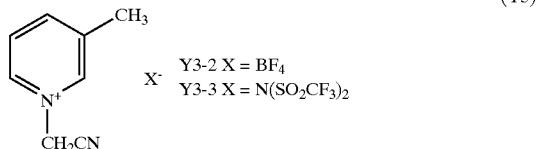

(Y3)

Y3-2 X = BF$_4$
Y3-3 X = N(SO$_2$CF$_3$)$_2$

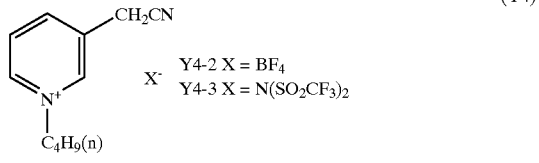

(Y4)

Y4-2 X = BF$_4$
Y4-3 X = N(SO$_2$CF$_3$)$_2$

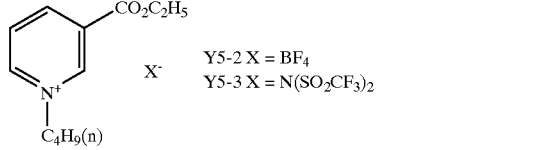

(Y5)

Y5-2 X = BF$_4$
Y5-3 X = N(SO$_2$CF$_3$)$_2$

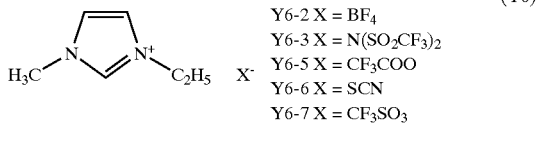

(Y6)

Y6-2 X = BF$_4$
Y6-3 X = N(SO$_2$CF$_3$)$_2$
Y6-5 X = CF$_3$COO
Y6-6 X = SCN
Y6-7 X = CF$_3$SO$_3$

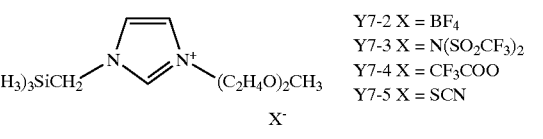

(Y7)

Y7-2 X = BF$_4$
Y7-3 X = N(SO$_2$CF$_3$)$_2$
Y7-4 X = CF$_3$COO
Y7-5 X = SCN

(Y8)

Y8-2 X = BF$_4$  Y8-6 X = SCN
Y8-3 X = N(SO$_2$CF$_3$)$_2$  Y8-7 X = CF$_3$SO$_3$
Y8-4 X = PF$_6$
Y8-5 X = CF$_3$COO

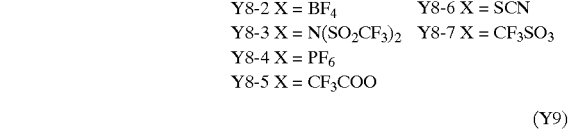

(Y9)

Y9-2 X = BF$_4$  Y9-5 X = SCN
Y9-3 X = N(SO$_2$CF$_3$)$_2$  Y9-6 X = CF$_3$SO$_3$
Y9-4 X = CF$_3$COO

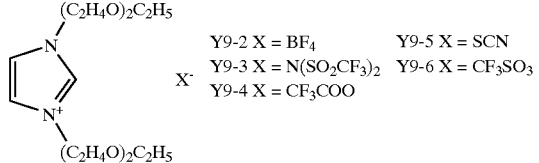

(Y10)

Y10-2 X = BF$_4$
Y10-3 X = N(SO$_2$CF$_3$)$_2$ (Y11) 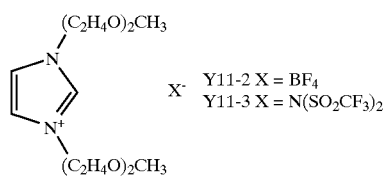
Y11-2 X = BF₄
Y11-3 X = N(SO₂CF₃)₂

(Y12) 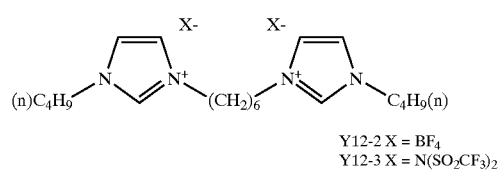
Y12-2 X = BF₄
Y12-3 X = N(SO₂CF₃)₂

(Y13) 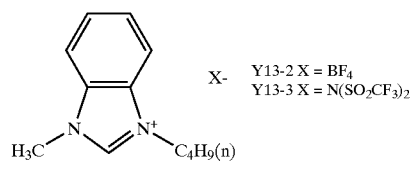
Y13-2 X = BF₄
Y13-3 X = N(SO₂CF₃)₂

(Y14) 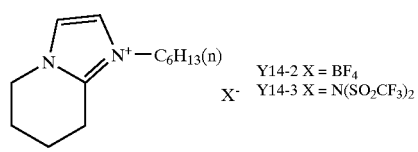
Y14-2 X = BF₄
Y14-3 X = N(SO₂CF₃)₂

(Y15) 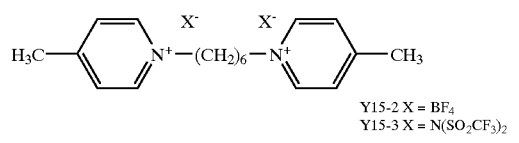
Y15-2 X = BF₄
Y15-3 X = N(SO₂CF₃)₂

(Y16) 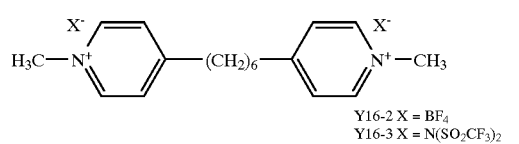
Y16-2 X = BF₄
Y16-3 X = N(SO₂CF₃)₂

(Y17) 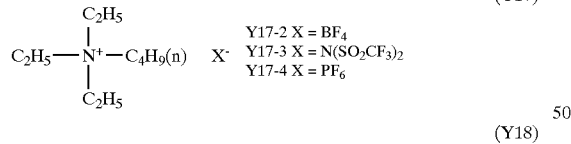
Y17-2 X = BF₄
Y17-3 X = N(SO₂CF₃)₂
Y17-4 X = PF₆

(Y18) 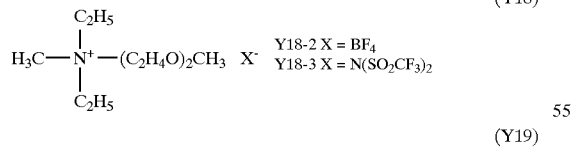
Y18-2 X = BF₄
Y18-3 X = N(SO₂CF₃)₂

(Y19) 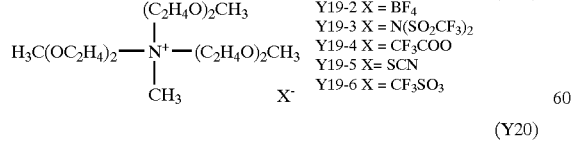
Y19-2 X = BF₄
Y19-3 X = N(SO₂CF₃)₂
Y19-4 X = CF₃COO
Y19-5 X = SCN
Y19-6 X = CF₃SO₃

(Y20) 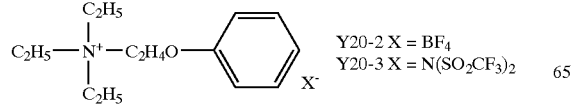
Y20-2 X = BF₄
Y20-3 X = N(SO₂CF₃)₂

(Y21) 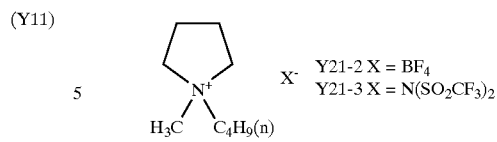
Y21-2 X = BF₄
Y21-3 X = N(SO₂CF₃)₂

(Y22) 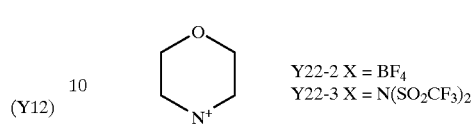
Y22-2 X = BF₄
Y22-3 X = N(SO₂CF₃)₂

(Y23) 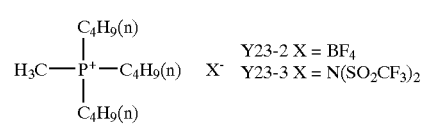
Y23-2 X = BF₄
Y23-3 X = N(SO₂CF₃)₂

(Y24) 
Y24-2 X = BF₄
Y24-3 X = N(SO₂CF₃)₂

(Y25) 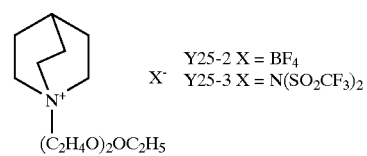
Y25-2 X = BF₄
Y25-3 X = N(SO₂CF₃)₂

(Y26) 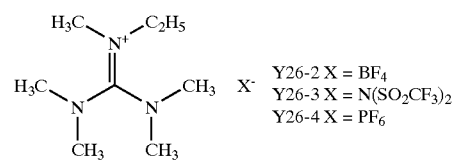
Y26-2 X = BF₄
Y26-3 X = N(SO₂CF₃)₂
Y26-4 X = PF₆

(Y27) 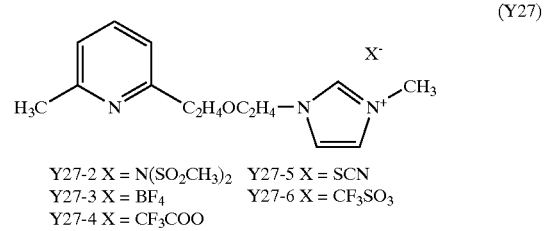
Y27-2 X = N(SO₂CH₃)₂
Y27-3 X = BF₄
Y27-4 X = CF₃COO
Y27-5 X = SCN
Y27-6 X = CF₃SO₃

(Y28) 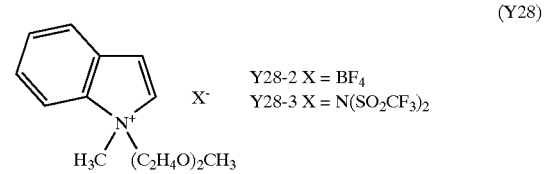
Y28-2 X = BF₄
Y28-3 X = N(SO₂CF₃)₂

(Y29) 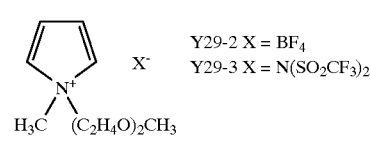
Y29-2 X = BF₄
Y29-3 X = N(SO₂CF₃)₂

<Silicon Polymer>

The silicon polymer to be in the electrolyte composition of the second aspect of the present invention is described.

The silicon polymer for use in the present invention includes those having a silicon atom-containing atomic group in the branches of the polymer skeleton (e.g., poly (p-trimethylsilylstyrene), poly(1-trimethylsilyl-1-propyne)), and those having silicon atoms in the polymer main chain. Of the two types, preferred are those having silicon atoms in the polymer main chain.

Preferred examples of the polymer having silicon atoms in its main chain are linear, branched, cyclic or polycyclic polymers having repetitive units of a structure of the following general formula (11):

General formula (11)

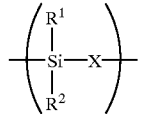

wherein $R^1$ and $R^2$ each are an alkyl group, an alkoxy group, an aryl group, or an aryloxy group; and X is an atomic group comprising an oxygen atom, a nitrogen atom, an alkylene group, a phenylene group, a silicon atom, a metal atom, or a combination thereof.

For the atomic group for X, for example, mentioned are polysiloxane, polysilazane, polysilmethylene, polysilphenylene, polysilane, and polymethallosiloxane. Of those, preferred for it are atomic groups comprising an oxygen atom or comprising a combination of an oxygen atom and an alkylene group; and more preferred is an oxygen atom.

Of the polymers having repetitive units of the structure of general formula (11), more preferred are linear, branched, cyclic or polycyclic polymers having repetitive units of a structure of the following general formula (12):

General formula (12)

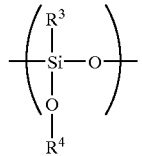

wherein $R^3$ represents an alkyl group, an alkoxy group, an aryl group, or an aryloxy group; and $R^4$ represents an alkyl group or an aryl group.

The alkyl group for $R^3$ and $R^4$ preferably has from 1 to 8 carbon atoms, more preferably from 1 to 4 carbon atoms. Concretely, for example, even more preferred are methyl, ethyl, propyl, n-butyl and t-butyl groups.

The aryl group for $R^3$ and $R^4$ preferably has from 6 to 10 carbon atoms. Concretely, for example, more preferred are phenyl and naphthyl groups.

The alkoxy group for $R^3$ preferably has from 1 to 8 carbon atoms, more preferably from 1 to 4 carbon atoms. Concretely, for example, even more preferred are methoxy, ethoxy, propoxy, n-butoxy and t-butoxy groups.

The aryloxy group for $R^3$ preferably has from 6 to 20 carbon atoms, more preferably from 6 to 10 carbon atoms. Concretely, for example, even more preferred are phenoxy, p-methylphenoxy, p-methoxyphenoxy and naphthoxy groups.

The alkyl and aryl groups for $R^3$ and $R^4$ and the alkoxy and aryloxy groups for $R^3$ may be substituted. Preferred examples of the substituent for these groups are mentioned below.

For example, the substituent includes a halogen atom, an alkyl group, an aryl group, a heterocyclic group, a cyano group, a nitro group, an alkoxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, an alkyl or arylsulfinyl group, an alkyl or arylsulfonyl group, an acyl group, an aryloxycarbonyl group, an alkoxycarbonyl group, a carbamoyl group, and a silyl group.

Preferred examples of the halogen atom are chlorine, bromine and iodine atoms.

The alkyl group may be a linear, branched or cyclic alkyl group, and its preferred examples are methyl, ethyl, n-propyl, isopropyl, t-butyl, n-octyl, eicosyl, 2-chloroethyl, 2-cyanoethyl, 2-ethylhexyl, cyclohexyl, cyclopentyl and 4-n-dodecylcyclohexyl groups.

Preferred examples of the aryl group are phenyl, p-tolyl, naphthyl and m-chlorophenyl groups.

Preferred examples of the heterocyclic group are monovalent groups derived from 5-membered or 6-membered, substituted or unsubstituted, aromatic or non-aromatic heterocyclic compounds by removing one hydrogen atom from them. More preferred are, for example, 2-furyl, 2-thienyl, 2-pyrimidinyl and 2-benzothiazolyl groups.

Preferred examples of the alkoxy group are methoxy, ethoxy, isopropoxy, t-butoxy, n-octyloxy, 2-methoxyethoxy groups, and —$O(CH_2CH_2O)_nCH_3$.

Preferred examples of the silyloxy group are trimethylsilyloxy, t-butyldimethylsilyloxy and trimethoxysilyloxy groups.

Preferred examples of the acyloxy group are formyloxy, acetyloxy, pivaloyloxy, stearoyloxy, benzoyloxy and p-methoxyphenylcabonyloxy groups.

Preferred examples of the carbamoyloxy group are N,N-dimethylcarbamoyloxy, N,N-diethylcarbamoyloxy, morpholinocarbonyloxy, N,N-di-n-octylaminocarbonyloxy and N-n-octylcarbamoyloxy groups.

Preferred examples of the alkoxycarbonyloxy group are methoxycarbonyloxy, ethoxycarbonyloxy, t-butoxycarbonyloxy and n-octylcarbonyloxy groups.

Preferred examples of the aryloxycarbonyloxy group are phenoxycarbonyloxy, p-methoxyphenoxycarbonyloxy and p-n-hexadecyloxyphenoxycarbonyloxy groups.

Preferred examples of the amino group are amino, methylamino, dimethylamino, anilino, N-methyl-anilino and diphenylamino groups.

Preferred examples of the acylamino group are formylamino, acetylamino, pivaloylamino, lauroylamino, benzoylamino and 3,4,5-tri-n-octyloxyphenylcarbonylamino groups.

Preferred examples of the aminocarbonylamino group are carbamoylamino, N,N-dimethylaminocarbonylamino, N,N-diethylaminocarbonylamino and morpholinocarbonylamino groups.

Preferred examples of the alkoxycarbonylamino group are methoxycarbonylamino, ethoxycarbonylamino, t-butoxycarbonylamino, n-octadecyloxycarbonylamino and N-methyl-methoxycarbonylamino groups.

Preferred examples of the aryloxycarbonylamino group are phenoxycarbonylamino, p-chlorophenoxycarbonylamino and m-n-octyloxyphenoxycarbonylamino groups.

Preferred examples of the sulfamoylamino group are sulfamoylamino, N,N-dimethylaminosulfonylamino and N-n-octylaminosulfonylamino groups.

Preferred examples of the alkyl or arylsulfonylamino group are methylsulfonylamino, butylsulfonylamino, phenylsulfonylamino, 2,3,5-trichlorophenylsulfonylamino and p-methylphenylsulfonylamino groups.

Preferred examples of the alkylthio group are methylthio, ethylthio and n-hexadecylthio groups.

Preferred examples of the arylthio group are phenylthio, p-chlorophenylthio and m-methoxyphenylthio groups.

The heterocyclic-thio group is preferably a substituted or unsubstituted heterocyclic-thio group having from 2 to 30 carbon atoms. More preferred are, for example, 2-benzothiazolylthio and 1-phenyltetrazol-5-ylthio groups.

Preferred examples of the sulfamoyl group are N-ethylsulfamoyl, N-(3-dodecyloxypropyl)sulfamoyl, N,N-dimethylsulfamoyl, N-acetylsulfamoyl, N-benzoylsulfamoyl and N-(N'-phenylcarbamoyl)sulfamoyl groups.

Preferred examples of the alkyl or arylsulfinyl group are methylsulfinyl, ethylsulfinyl, phenylsulfinyl and p-methylphenylsulfinyl groups.

Preferred examples of the alkyl or arylsulfonyl group are methylsulfonyl, ethylsulfonyl, phenylsulfonyl and p-methylphenylsulfonyl groups.

Preferred examples of the acyl group are acetyl, pivaloyl, 2-chloroacetyl, stearoyl, benzoyl and p-n-octyloxyphenylcarbonyl groups.

Preferred examples of the aryloxycarbonyl group are phenoxycarbonyl, o-chlorophenoxycarbonyl, m-nitrophenoxycarbonyl and p-t-butylphenoxycarbonyl groups.

Preferred examples of the alkoxycarbonyl group are methoxycarbonyl, ethoxycarbonyl, t-butoxycarbonyl and n-octadecyloxycarbonyl groups.

Preferred examples of the carbamoyl group are carbamoyl, N-methylcarbamoyl, N,N-dimethylcarbamoyl, N,N-di-n-octylcarbamoyl and N-(methylsulfonyl)carbamoyl groups.

The silyl group is preferably a substituted or unsubstituted silyl group having from 3 to 30 carbon atoms. More preferred are, for example, trimethylsilyl, t-butyldimethylsilyl and phenyldimethylsilyl groups.

In general formula (12), $R^3$ is more preferably an alkoxy group. Even more preferably, at least one of $R^3$ and $OR^4$ has an alkoxycarbonyl group for its substituent.

Specific examples (A'-1 to A'-15) of the repetitive units for the polymer compound having repetitive units of the structure of general formula (11) or (12) are shown below, to which, however, the present invention is not limited.

A'-1

A'-2

A'-3

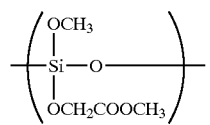

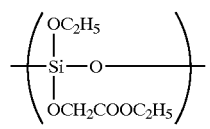

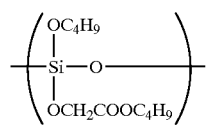

A'-4

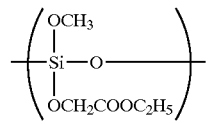

A'-5

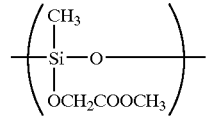

A'-6

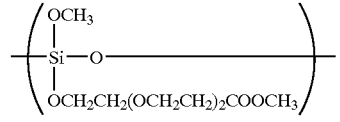

A'-7

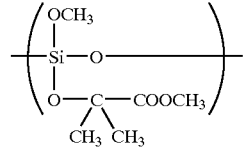

A'-8

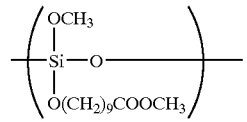

A'-9

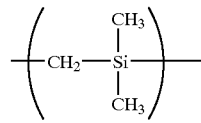

A'-10

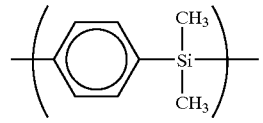

A'-11

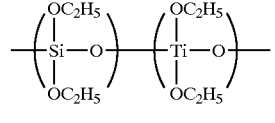

A'-12

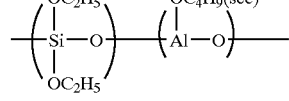

A'-13

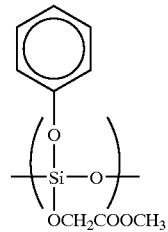

A'-14

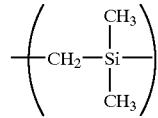

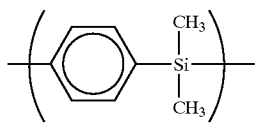
A'-15

Preferably, the silicon polymer having repetitive units of the structure of general formula (12) is prepared by reacting a compound of the following general formula (13) with a hydroxyl group-having carboxylic acid:

 General formula (13)

wherein $R^3$ has the same meaning as in general formula (12); and $R^5$ is a substituted or unsubstituted alkyl group, or a substituted or unsubstituted aryl group.

The alkyl groups for $R^5$'s may be the same or different. The meaning of the alkyl group for $R^5$ is the same as that of $R^4$ in general formula (12).

The aryl groups for $R^5$'s may be the same or different. The meaning of the aryl group for $R^5$ is the same as that of $R^4$ in general formula (12).

Specific examples (2'-1 to 2'-8) of the compound of general formula (13) are mentioned below, to which, however, the present invention is not limited.

 2'-1

 2'-2

 2'-3

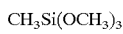 2'-4

 2'-5

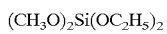 2'-6

2'-7

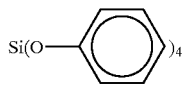

2'-8

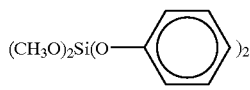

The hydroxyl group-having carboxylic acid is preferably represented by the following general formula (14):

General formula (14)

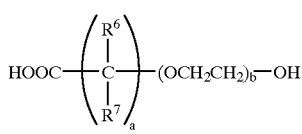

wherein $R^6$ and $R^7$ each independently represent a hydrogen atom or an alkyl group. The meaning of the alkyl group for $R^6$ and $R^7$ is the same as that of $R^3$ in general formula (12). Preferably, $R^6$ and $R^7$ are hydrogen atoms.

In general formula (14), a indicates an integer of from 1 to 5, and b indicates an integer of from 0 to 30. When a is 2 or more, $R^6$'s and $R^7$'s may be the same or different.

For specific examples of the hydroxyl group-having carboxylic acids and those of the compounds of general formula (14), referred to are the specific examples, 3-1 to 3-10, of the compounds of general formula (3) mentioned hereinabove, to which, however, the present invention is not limited.

Preferably, the silicon polymer having repetitive units of the structure of general formula (12) is prepared by reacting a silicon polymer having repetitive units of a structure of the following general formula (15), with an alcohol compound. More preferably, the alcohol compound has an alkoxycarbonyl group:

General formula (15)

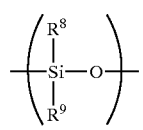

wherein $R^8$ has the same meaning as $R^3$ in general formula (12), therefore indicating an alkyl group, an alkoxy group, an aryl group or an aryloxy group; and $R^9$ represents an alkoxy group.

The meaning of the alkoxy group for $R^8$ and $R^9$ in general formula (15) is the same as that of $R^3$ in general formula (12).

For specific examples of the silicon polymer having repetitive units of the structure of general formula (15), referred to are the specific examples, 4-1 to 4-5, of the polymer compounds having repetitive units of the structure of general formula (4) mentioned hereinabove, to which, however, the present invention is not limited.

More preferably, the alkoxycarbonyl group-having alcohol compound is represented by the following general formula (16):

General formula (16)

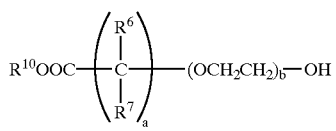

wherein $R^6$, $R^7$, a and b have the same meanings as those in general formula (14); $R^{10}$ has the same meaning as $R^5$ in general formula (13), therefore indicating a substituted or unsubstituted alkyl group, or a substituted or unsubstituted aryl group.

The meanings of the alkyl and aryl groups for $R^{10}$ are the same as those of the alkyl and aryl groups for $R^3$ in general formula (12).

For specific examples of the alcohol compound, referred to are the specific examples, 5-1 to 5-13, of the alkoxycarbonyl group-having alcohol compounds mentioned hereinabove, to which, however, the present invention is not limited.

<Method for Producing Electrolyte Composition>

The reaction of the compound of general formula (13) with the hydroxyl group-having carboxylic acid (hereinafter referred to as "reaction A'") and the reaction of the silicon polymer having repetitive units of the structure of general formula (15) with the alcohol compound (hereinafter referred to as "reaction B'") may be effected in the presence or absence of a solvent, but is preferably effected not using a solvent, that is, in the absence of a solvent.

The reaction temperature for the reaction A' and the reaction B' preferably falls between room temperature and the reflux point of the reaction mixture.

The reaction time for the reaction A' and the reaction B' preferably falls between 30 minutes and 7 days, more preferably between 1 hour and 2 days.

For controlling the reaction speed, the reaction temperature and the reaction time are not limited to the above.

Preferably after the reaction A' and the reaction B', the volatile components are evaporated away from the reaction product produced. For evaporating the volatile components, the reaction mixture is preferably heated under reduced pressure. Concretely, the reaction mixture is heated at 100° C. under a reduced pressure of 5 mmHg (667 Pa) until the weight loss of the reaction product reaches at most 50%, more preferably at most 30%.

In the method for producing the electrolyte composition of the present invention, the step of preparing a silicon polymer having repetitive units of the structure of general formula (12) (reaction A' or reaction B') and the step of adding a molten salt and a salt of a metal ion of Group 1 (Ia) or 2 (IIa) of the Periodic table to the silicon polymer may be effected at the same time, or alternatively, the molten salt and the metal ion salt may be added thereto after the silicon polymer has been prepared.

Concretely, the step of preparing the silicon polymer (reaction A' or reaction B') may be effected in the presence of a molten salt and a salt of a metal ion of Group 1 (Ia) or 2 (IIa) of the Periodic Table; or alternatively, the molten salt and the metal ion salt may be added to the silicon polymer already prepared.

In the step of the reaction A' to prepare the silicon polymer, the ratio of the hydroxyl group-having carboxylic acid ($A'^2$) to the compound of general formula (13) ($A'^1$), $A'^2/A'^1$ preferably falls between 0.1 and n (by mol), in which n has the same meaning as in general formula (6), more preferably between 0.2 and 2, even more preferably between 0.5 and 1.

In the step of the reaction B' to prepare the silicon polymer, the amount of the alcohol compound ($B'^1$) to be added thereto preferably falls between 1% by weight and 300% by weight, more preferably between 10% by weight and 200% by weight, even more preferably between 30% by weight and 150% by weight of the silicon polymer having repetitive units of the structure of general formula (15) ($B'^2$).

The electrolyte composition of the second aspect of the present invention may contain a solvent of which the amount is at most the same by weight of the polymer compound therein. From the viewpoint of storage stability thereof, however, the electrolyte composition does not contain a solvent.

The electrolyte composition of the second aspect of the present invention may be infiltrated into electrodes, for example, according to a method of dissolving it under heat, or a method of infiltrating it into electrodes optionally under reduced pressure, or a method of infiltrating it into electrodes along with a low-boiling-point solvent (e.g., methanol, acetonitrile, methylene chloride) followed by removing the solvent under heat, and the thus-processed electrodes may be built in cells.

The solvent for use in the electrolyte composition of the second aspect of the present invention is preferably a compound of low viscosity capable of increasing the ionic mobility in the electrolyte composition containing it or a compound of high permittivity capable of increasing the effective carrier concentration therein, therefore being able to develop good ion conduction through the electrolyte composition containing it. For preferred examples of the solvent of this type for use herein, referred to are those of the solvent for use in the electrolyte composition of the first aspect of the present invention mentioned hereinabove. One or more such solvents may be in the electrolyte composition, either singly or as combined.

Regarding their properties, it is desirable that the preferred solvents have a boiling point at ordinary pressure (1 atmosphere) of not lower than 200° C., more desirably not lower than 250° C., even more desirably not lower than 270° C., as they are non-volatile and therefore do not detract from the durability of cells.

<Salt of Metal Ion of Group 1 or 2 of the Periodic Table>

The salt of a metal ion of Group 1 (Ia) or 2 (IIa) of the Periodic Table to be in the electrolyte composition of the present invention is described.

The metal ion of Group 1 (Ia) or 2 (IIa) of the Periodic Table to be in the electrolyte composition of the present invention is preferably an ion of lithium, sodium or potassium. Typical examples of the salt of such a metal salt are $LiCF_3SO_3$, $LiPF_6$, $LiClO_4$, $LiI$, $LiBF_4$, $LiCF_3CO_2$, $LiSCN$, $LiN(SO_2CF_3)_2$, $NaI$, $NaCF_3SO_3$, $NaClO_4$, $NaBF_4$, $NaAsF_6$, $KCF_3SO_3$, $KSCN$, $KPF_6$, $KClO_4$, and $KAsF_6$.

Of the examples of the metal ion salt, more preferred are the Li salts.

One or more of the metal ion salts may be in the electrolyte composition, either singly or as combined.

Preferably, the metal ion salt concentration (corresponding to the amount of the metal ion salt added) in the electrolyte composition of the present invention falls between 1% by weight and 300% by weight, more preferably between 3% by weight and 200% by weight of the molten salt therein.

Also preferably, the amount of the silicon polymer to be in the electrolyte composition falls between 3% by weight and 300% by weight, more preferably between 5% by weight and 200% by weight of the molten salt therein.

<Compound Having at Least Two Nucleophilic Groups in the Molecule>

The electrolyte composition of the second aspect of the present invention may be crosslinked and solidified through reaction of a compound having at least two nucleophilic groups in the molecule (the compound will be hereinafter referred to as "nucleating agent").

For preventing leakage and evaporation thereof through cells, the electrolyte composition is preferably solidified in cells.

The compound having at least two nucleophilic groups in the molecule for use herein is the same as that in the electrolyte composition of the first aspect of the present invention mentioned hereinabove; and its preferred examples are also the same as those of the compound therein.

The electrolyte composition of the second aspect of the present invention may be gelled (solidified), for example, through polymer addition thereto, oil-gelling agent addition thereto, polyfunctional monomer polymerization therein, or polymer crosslinking therein.

For gelling the electrolyte composition through polymer addition thereto, for example, employable are the compounds described in *Polymer Electrolyte Reviews 1 and 2* (by J. R. MacCallum and C. A. Vincent, ELSEVIER APPLIED SCIENCE). Especially preferred for it are polyacrylonitrile, polyvinylidene fluoride, polyethylene oxide and polysiloxane.

Compounds usable for gelling the electrolyte composition through oil-gelling agent addition thereto are described in journals of industrial science. For example, preferred for it are the compounds described in *J. Chem. Soc. Japan*, Ind. Chem. Soc., 46, 779 (1943); *J. Am. Chem. Soc.*, 111, 5542 (1989); *J. Chem. Soc., Chem. Commun.*, 1993, 390; *Angew. Chem. Int. Ed. Engl.*, 35, 1949 (1996); *Chem. Lett.*, 1996, 885; *J. Chem. Soc.*, Chem. Commun., 1997, 545. More preferred are compounds having an amido structure in the molecule.

(Non-Aqueous Electrolyte Secondary Cell)

The non-aqueous electrolyte secondary cell of the present invention is described.

<Positive Electrode Active Material>

In cases where the electrolyte composition of the present invention is used in secondary cells, the positive electrode active material to be in the cells may be a transition metal oxide capable of reversibly absorbing and releasing lithium ions. Preferred for it are lithium-containing transition metal oxides.

The lithium-containing transition metal oxides preferred for the positive electrode active material in the present invention are lithium-containing oxides of any of Ti, V, Cr, Mn, Fe, Co, Ni, Cu, Mo and W.

The oxides may further contain any of alkali metals (of Groups 1 (Ia) and 2 (IIa) of the Periodic Table) except lithium, and/or Al, Ga, In, Ge, Sn, Pb, Sb, Bi, Si, P and B. The amount of the additional element that may be in the oxides preferably falls between 0 and 30 mol % of the transition metal therein.

Of the lithium-containing transition metal oxides preferred for the positive electrode active material, more preferred are those prepared by mixing the constituent components in a molar ratio, lithium compound/total of transition metal compound (in which the transition metal is at least one selected from Ti, V, Cr, Mn, Fe, Co, Ni, Mo and W) falling between 0.3 and 2.2.

Of the lithium compound/transition metal compound, more preferred are a material that contains $Li_gM^3O_2$ (in which $M^3$ is at least one element of Co, Ni, Fe and Mn, and g falls between 0 and 1.2), and a material having a spinel structure of $Li_hM^4{}_2O$ (in which $M^4$ is Mn; and h falls between 0 and 2).

$M^3$ and $M^4$ may contain any of Al, Ga, In, Ge, Sn, Pb, Sb, Bi, Si, P and B combined with the transition metal therein. The amount of the additional element preferably falls between 0 and 30 mol % of the transition metal.

Of the material containing $Li_gM^3O_2$, and the material having a spinel structure of $Li_hM^4{}_2O$, more preferred are $Li_gCoO_2$, $Li_gNiO_2$, $Li_gMnO_2$, $Li_gCo_jNi_{1-j}O_2$, and $Li_hMn_2O_4$, in which g falls between 0.02 and 1.2, j falls between 0.1 and 0.9, and h falls between 0 and 2.

The values g and h are those before the start of charging/discharging, and they increase or decrease after charging/discharging.

The positive electrode active material can be produced according to a method of mixing or calcining a lithium compound and a transition metal compound, or according to a method of solution reaction of the compounds. Especially preferably, it is produced in a method of calcining the compounds.

In the calcination method for the present invention, the calcination temperature may be a temperature at which the mixed compounds partly decompose and melt. Preferably, for example, it falls between 250 and 2,000° C., more preferably between 350 and 1,500° C. Even more preferably, the mixed compounds are pre-calcined at 250 to 900° C.

In the calcination method, the calcination time preferably falls between 1 and 72 hours, more preferably between 2 and 20 hours.

Mixing the starting compounds may be effected either in dry or in wet. After calcined, the product may be annealed at 200 to 900° C.

In the calcination method, the vapor atmosphere is not specifically defined, and may be any of oxidizing atmosphere or reducing atmosphere. For example, it includes a mixed gas of air and oxygen in any desired ratio, as well as hydrogen, carbon monoxide, nitrogen, argon, helium, krypton, xenon, and carbon dioxide.

In the non-aqueous electrolyte secondary cell of the present invention, the mean particle size of the positive electrode active material is not specifically defined, but preferably falls between 0.1 and 50 μm. The specific surface area thereof is not also specifically defined, but preferably falls between 0.01 and 50 m²/g measured according to the BET method.

Also preferably, the pH of the supernatant of 5 g of the positive electrode active material dissolved in 100 ml of distilled water falls between 7 and 12.

For controlling the positive electrode active material to have a desired particle size, employable are well-known grinders and classifiers. For example, employable are any of mortars, ball mills, shaking ball mills, shaking mills, satellite ball mills, planetary ball mills, rotary jet mills, and sieves.

The positive electrode active material prepared according to the calcination method may be washed with any of water, acidic aqueous solutions, alkaline aqueous solutions or organic solvents before use.

<Negative Electrode Active Material>

One type of negative electrode active material for use in the non-aqueous electrolyte secondary cell of the present invention is preferably a carbonaceous material capable of absorbing and releasing lithium.

The carbonaceous material substantially comprises carbon. For example, it includes petroleum pitch, natural graphite, artificial graphite such as that grown in a vapor phase, and those produced by calcining various types of synthetic resin such as PAN resin and furfuryl alcohol resin.

It further includes various types of carbon fibers such as PAN carbon fibers, cellulosic carbon fibers, pitch carbon fibers, carbon fibers grown in a vapor phase, dehydrated PVA carbon fibers, lignin carbon fibers, glassy carbon fibers, activated carbon fibers; and mesophase microballoons, graphite whiskers, and tabular graphite.

The carbonaceous material of those types is grouped into a graphite-poor carbonaceous material and a graphite-rich carbonaceous material, depending on the degree of graphitization thereof. Regarding the spacing of lattice planes, the density, and the size of crystallites of the carbonaceous material for use herein, preferred are those described in JP-A Nos. 62-22066, 2-6856 and 3-45473.

The carbonaceous material for use herein is not necessarily a single material. For example, it may be a mixture of natural graphite and artificial graphite as in JP-A No. 5-90844, or coated graphite as in JP-A No. 6-4516.

Another type of negative electrode active material to be in the non-aqueous electrolyte secondary cell of the present invention is preferably oxides and/or chalcogenides.

Of those, more preferred are amorphous oxides and/or chalcogenides.

The term "amorphous" referred to herein is meant to indicate that the oxide substance has a broad scattering zone in which the peak falls within a region of from 20° to 40° for 2θ, measured through X-ray diffractometry with CuKα rays, and the oxide substance may have a crystalline diffraction zone.

Preferably, the amorphous oxides for use in the present invention are such that the intensity of the peak in the crystalline diffraction pattern of the compound appearing within a range of from 40° to 70° for 2θ is at most 100 times, but more preferably at most 5 times the intensity of the peak in the broad scattered pattern thereof seen within the region of from 20° to 40° for 2θ. Even more preferably, they have no crystalline diffraction zone.

Of such amorphous oxides and/or chalcogenides, more preferred are amorphous oxides of semi-metal elements, and/or chalcogenides; and even more preferred are oxides of one or more elements of the Groups 13 (IIIB) to 15 (VB) of the Periodic Table, and Al, Ga, Si, Sn, Ge, Pb, Sb and Bi, and chalcogenides.

Preferred examples of such preferred amorphous oxides and/or chalcogenides are $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2O_3$, $Sb_2S_5$, and $SnSiS_3$. These may form composite oxides with lithium oxide, such as $Li_2SnO_2$.

Of the amorphous oxides and/or chalcogenides preferred for the negative electrode active material to be in the non-aqueous electrolyte secondary cell of the present invention, more preferred are amorphous oxides having, as the center element, any of Sn, Si and Ge; and even more preferred are amorphous oxides of the following general formula (17).

$$SnM^1{}_dM^2{}_eO_f \qquad \text{General formula (17)}$$

wherein $M^1$ indicates at least one element of Al, B, P and Ge; $M^2$ indicates at least one element selected from those of Groups 1 (Ia), 2 (IIa) and 3 (IIIa) of the Periodic Table and halogen elements; d is a number falling between 0.2 and 2; e is a number falling between 0.01 and 1; 0.2<d+e<2; and f is a number falling between 1 and 6.

Specific examples (C-1 to C-18) of the amorphous oxides that consist essentially of Sn are mentioned below, to which, the present invention is not limited.

| | |
|---|---|
| $SnSiO_3$ | C-1: |
| $Sn_{0.8}Al_{0.2}B_{0.3}P_{0.2}Si_{0.5}O_{3.6}$ | C-2: |
| $SnAl_{0.4}B_{0.5}Cs_{0.1}P_{0.5}O_{3.65}$ | C-3: |
| $SnAl_{0.4}B_{0.5}Mg_{0.1}P_{0.5}O_{3.7}$ | C-4: |
| $SnAl_{0.4}B_{0.4}Ba_{0.08}P_{0.4}O_{3.28}$ | C-5: |
| $SnAl_{0.4}B_{0.5}Ba_{0.08}Mg_{0.08}P_{0.3}O_{3.26}$ | C-6: |
| $SnAl_{0.1}B_{0.2}Ca_{0.1}P_{0.1}Si_{0.5}O_{3.1}$ | C-7: |
| $SnAl_{0.2}B_{0.4}Si_{0.4}O_{2.7}$ | C-8: |
| $SnAl_{0.2}B_{0.1}Mg_{0.1}P_{0.1}Si_{0.5}O_{2.6}$ | C-9: |
| $SnAl_{0.3}B_{0.4}P_{0.2}Si_{0.5}O_{3.55}$ | C-10: |
| $SnAl_{0.3}B_{0.4}P_{0.5}Si_{0.5}O_{4.3}$ | C-11: |
| $SnAl_{0.1}B_{0.1}P_{0.3}Si_{0.6}O_{3.25}$ | C-12: |
| $SnAl_{0.1}B_{0.1}Ba_{0.2}P_{0.1}Si_{0.6}O_{2.95}$ | C-13: |
| $SnAl_{0.1}B_{0.1}Ca_{0.2}P_{0.1}Si_{0.6}O_{2.95}$ | C-14: |
| $SnAl_{0.4}B_{0.2}Mg_{0.1}Si_{0.6}O_{3.2}$ | C-15: |
| $SnAl_{0.1}B_{0.3}P_{0.1}Si_{0.5}O_{3.05}$ | C-16: |
| $SnB_{0.1}K_{0.5}P_{0.1}SiO_{3.65}$ | C-17: |
| $SnB_{0.5}F_{0.1}Mg_{0.1}P_{0.5}O_{3.05}$ | C-18: |

For producing the amorphous oxides and/or chalcogenides for use in the present invention, employable is any of a calcination method and a solution method, but preferred is a calcination method.

One preferred mode of the calcination method comprises well mixing the corresponding element oxides, chalcogenides or compounds followed by calcining the resulting mixture to obtain the intended amorphous oxides and/or chalcogenides.

In the calcination method, the temperature for calcination preferably falls between 500° C. and 1,500° C., and the time preferably falls between 1 hour and 100 hours.

In the method, the calcined product may be cooled in the calcination furnace as it is, or may be taken out of the furnace and put into water for cooling it therein. As the case may be, ultra-rapid chilling processes, for example a gun process, a hammer-anvil process, a slap process, a gas-atomizing process, a plasma spray process, a centrifugal quenching process or a melt drag process, such as those described in "Ceramic Processing" (by Gihodo Publishing, 1987), page 217 may also be employed for cooling the calcined product.

A single roller process or a twin roller process such as those described in "New Glass Handbook" (by Maruzen, 1991), page 172 may also be employed for cooling it. In cases where the starting materials are fused while calcined, the calcined product may be continuously taken out of the furnace with the starting materials being continuously fed thereinto. In this case, it is desirable that the flux is stirred.

It is desirable that the calcination gas atmosphere in the method has an oxygen content of at most 5% by volume, and more preferred is an inert gas atmosphere. Preferred examples of the inert gas are nitrogen, argon, helium, krypton and xenon. Of those, more preferred is pure argon.

The mean particle size of the negative electrode active material for use in the non-aqueous electrolyte secondary cell of the present invention preferably falls between 0.1 and 60 µm. For controlling the negative electrode active material to have a desired particle size, employable are well-known grinders and classifiers. For example, preferred are mortars, ball mills, sand mills, shaking ball mills, satellite ball mills, planetary ball mills, rotary jet mills, and sieves.

If desired, the active material may be ground in wet in the presence of water or an organic solvent such as methanol. Preferably, the ground particles are classified so that they may have a desired particle size. The method of classification is not specifically defined, for which, for example, employable is any of sieves or air classifiers. The classification may be effected in dry or in wet.

The chemical structure of the compound obtained according to the calcination method may be determined through inductively coupled plasma-atomic emission spectroscopy (ICP-AES). One easy method comprises measuring the weight of the powder before and after calcined, in which the calcined product is identified by the weight difference.

Preferred examples of the negative electrode active material that may be combined with the amorphous oxide having a center element of Sn, Si or Ge are a carbonaceous material capable of absorbing and releasing lithium ions or lithium metal, as well as lithium, lithium alloys, and metals capable of alloying with lithium.

<Electrode Mixture>

To the electrode mixture for use in the present invention, added are any of an electroconductive agent, a binder, a filler, and also a polymer network having repetitive units of the structure of general formula (11), a lithium salt, and an aprotic organic solvent.

The electroconductive agent may be any and every electroconductive material not undergoing chemical reaction in constructed secondary cells. Generally used are electroconductive materials such as natural graphite (e.g., scaly graphite, flaky graphite, earthy graphite), artificial graphite, carbon black, acetylene black, ketjen black, carbon fibers, metal powders (e.g., copper, nickel, aluminium, silver (as in JP-A No. 63-148554)), metal fibers, and polyphenylene derivatives (as in JP-A No. 59-20971). One or more of these may be used either singly or as combined. Of those, preferred is a combination of graphite and acetylene black.

The amount of the electroconductive agent to be added preferably falls between 1 and 50% by weight, more preferably between 2 and 30% by weight. Even more preferably, the amount of carbon or graphite falls between 2 and 15% by weight.

A binder is used for binding and supporting the electrode mixture.

The binder includes, for example, polysaccharides, thermoplastic resins, and polymers of rubber elasticity. Of those, preferred are water-soluble polymers such as starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinylmethyl ether, polyvinyl alcohol, polyvinylpyrrolidone, polyacrylonitrile, polyacrylamide, polyhydroxy(meth)acrylate, styrene-maleic acid copolymer; as well as emulsion (latex) or suspension of polyvinyl chloride, polytetrafluoroethylene, polyvinylidene fluoride, tetrafluoroethylene-hexafluoropropylene copolymer, vinylidene fluoride-tetrafluoroethylene-hexafluoropropylene copolymer, polyethylene, polypropylene, ethylene-propylene-diene terpolymer (EPDM), sulfonated EPDM, polyvinylacetal resin, (meth)acrylate copolymer having (meth)acrylate (e.g., methyl methacrylate, 2-ethylhexyl acrylate), (meth)acrylate-acrylonitrile copolymer, polyvinyl ester copolymer having vinyl ester (e.g., vinyl acetate), styrene-butadiene copolymer, acrylonitrile-butadiene copolymer, polybutadiene, neoprene rubber, fluororubber, polyethylene oxide, polyester-polyurethane resin, polyether-polyurethane resin, polycarbonate-polyurethane resin, polyester resin, phenolic resin, and epoxy resin. More preferred are polyacrylate latex, carboxymethyl cellulose, polytetrafluoroethylene, and polyvinylidene fluoride.

One or more such binders may be used either singly or as combined. If the amount of the binder is too small, the self-retentiveness and the cohesive strength of the electrode mixture will be poor. If too much, on the other hand, the electrode volume increases, and the capacity per the electrode unit volume or unit weight decreases. For these reasons, the amount of the binder to be added preferably falls between 1 and 30% by weight, more preferably between 2 and 10% by weight.

The filler may be any and every type of fibrous material not undergoing chemical reaction in the secondary cell of the present invention. For it, generally employed are fibers of olefinic polymers such as polypropylene or polyethylene, as well as glass fibers or carbon fibers.

The amount of the filler to be added is not specifically defined, but preferably falls between 0 and 30% by weight.
<Separator>

For ensuring the safety of cells, the electrolyte composition of the present invention may be used along with a separator. The separator to be used for ensuring the safety of cells must have the function of sealing up its pores mentioned below to increase its resistance to thereby shut off the current running through it. Preferably, the pore-sealing point of the separator falls between 90° C. and 180° C.

The pores of the separator are generally circular or oval, and their size may fall between 0.05 and 30 µm, but preferably between 0.1 and 20 µm. The separator may have cylindrical or amorphous pores, when formed in a drawing method or a phase separation method. The proportion of the pores, that is, the porosity of the separator may fall between 20 and 90%, but preferably between 35 and 80%.

The separator may be formed of a single material of, for example, polyethylene or polypropylene, or may be formed of a composite material of two or more such polymers. For the separator, preferred is a laminate of two or more porous films that differ in the pore size, the porosity and the pore-sealing point.
<Collector>

For positive and negative electrode collectors in the non-aqueous electrolyte secondary cell of the present invention, used are electronic conductors not undergoing chemical reaction in the cell.

For the positive electrode collector, for example, preferred are aluminium, stainless steel, nickel, titanium, as well as aluminium and stainless steel processed with any of carbon, nickel, titanium or silver on the surface. Of those, more preferred are aluminium and aluminium alloys.

For the negative electrode collector, preferred are copper, stainless steel, nickel and titanium; and more preferred are copper and copper alloys.

Regarding its shape, the collector is generally in the form of a film or sheet. If desired, it may be netted or punched. Lath, porous, foamed or fibrous moldings are also usable for the collector.

The thickness of the collector is not specifically defined, but preferably falls between 1 and 500 µm.

Embossing the surface of the collector through surface treatment is also preferred.
<Fabrication of Non-Aqueous Electrolyte Secondary Cell>

Fabrication of the non-aqueous electrolyte secondary cell of the present invention is described.

Regarding its shape, the non-aqueous electrolyte secondary cell of the present invention applies to any form of sheets, and angular or cylindrical rods.

The positive and negative active material mixtures are applied on the respective collectors, for example, according to a coating method of applying them thereon followed by drying and compressing the thus-coated collectors.

For the coating method for the mixtures, for example, preferred are a reverse roll method, a direct roll coating method, a blade coating method, a knife coating method, an extrusion coating method, a curtain coating method, a gravure coating method, a bar coating method, a dipping method, and a squeezing method. Of those, more preferred are a blade coating method, a knife coating method and an extrusion coating method.

The coating speed preferably falls between 0.1 and 100 m/sec. Depending on the physical properties of the mixture solution and the drying property thereof, a suitable coating method is selected from the methods mentioned above to ensure the best surface condition of the layer formed. Regarding the coating mode, one surface of the collector is first coated with the active material mixture and the other is then coated with it; or both surfaces of the collector may be coated with it all at a time.

The coating pattern may be a continuous or intermittent one, or may be in the form of stripes. The thickness, the length and the width of the coating layer shall be determined, depending on the shape and the size of the cell. Preferably, for example, the thickness of the coating layer on one surface of the collector falls between 1 and 2000 µm, after being dried and compressed.

For drying and dewatering the coated electrode sheets, for example, employable are any of hot air, vacuum pressure, IR rays, far-IR rays, electronic radiations and low-moisture air, either singly or as combined. The drying temperature preferably falls between 80 and 350° C., more preferably between 100 and 250° C.

Preferably, the water content of the cell is at most 2000 ppm in total. Also preferably, the water content of the positive electrode mixture, the negative electrode mixture and the electrolyte is at most 500 ppm each.

Pressing the electrode sheets may be effected in any ordinary manner, for which, however, preferred is a calendering method. The pressure for it is not specifically defined, but preferably falls between 0.2 and 3 t/cm$^2$. The calendering speed preferably falls between 0.1 and 50 m/sec; and the calendering temperature preferably falls between room temperature and 200° C.

The ratio of the width of the negative electrode sheet to that of the positive electrode sheet preferably falls between 0.9 and 1.1, more preferably between 0.95 and 1.0. The ratio of the positive electrode active material to the negative electrode active material in the cell varies, depending on the type of compounds constituting the materials and on the formulation of the electrode mixtures.

The positive and negative electrode sheets fabricated in the manner as above are laminated via a separator put therebetween. The resulting laminate may be directly worked into sheet cells. Angular cells may be formed as follows: The laminate is folded and inserted into an angular casing, the electrode sheets are electrically connected with the casing, then the electrolyte composition of the present invention is introduced into the casing, and the casing is sealed with a sealer plate.

Cylinder cells may be formed as follows: The positive and negative electrode sheets are laminated via a separator put therebetween, coiled up and put into a cylindrical casing, the electrode sheets are electrically connected with the casing, then the electrolyte composition of the present invention is introduced into the casing, and the casing is sealed with a sealer plate. For the sealer plate, usable is a safety valve. In place of such a safety valve, also usable are any other safety devices known in the art. For example, preferably used are fuses, bimetals or PTC devices that serve as overcurrent-preventing devices.

Any other methods for preventing the inner pressure of the cells from increasing are also employable herein, in place of using the safety valve as above. For example, the cell casing may be slit by notching it, the gasket may be slit by cracking it, the sealer plate may be slit by cracking it, or the lead plate may be cut off. If desired, the charger for the cell may be provided with a protection circuit having an overcharge or overdischarge device built therein, or such a protection circuit may be independently connected to the cell.

Also for preventing it from being overcharged, the cell may be provided with a current-blocking device that acts to increase the inner pressure of the cell to thereby block the current running through the cell. For this, a compound having the ability to increase the inner pressure may be added to the electrode mixture or to the electrolyte. One example of the compound of this type is a carbonate, including, for example, $Li_2CO_3$, $LiHCO_3$, $Na_2CO_3$, $NaHCO_3$, $CaCO_3$ and $MgCO_3$.

The cell casing and the lead plate may be formed of electroconductive metals or alloys. For these, for example, preferred are metals such as iron, nickel, titanium, chromium, molybdenum, copper and aluminium, and their alloys.

For welding the cell cap, the cell casing, the electrode sheet and the lead plate, employable is any known method (e.g., DC or AC welding, laser welding, ultrasonic welding). For the sealant for the sealer plate, employable are various compounds and mixtures well known in the art.

The use of the non-aqueous electrolyte secondary cell of the present invention is not specifically defined. For example, the cell may be mounted on various electronic appliances such as notebook-sized personal computers, pen-input personal computers, mobile personal computers, electronic book players, mobile telephones, cordless phone extensions, pagers, handy terminals, mobile facsimiles, mobile duplicators, mobile printers, headphone stereos, video movies, LCD televisions, handy cleaners, portable CDs, mini-discs, electric shavers, transceivers, electronic pocketbooks, electronic pocket or desk-top calculators, memory cards, mobile tape recorders, radios, backup sources, etc. In addition, the cell has many other industrial applications, for example, in automobiles, electric trains, motors, illuminators, toys, game appliances, road conditioners, watches, clocks, strobes, cameras, medical appliances (e.g., pacemakers, hearing aids, shoulder massagers), etc. Further, the cell is also usable in the munitions industry and in the space industry. It may be combined with solar cells.

EXAMPLES

The present invention is described in more detail with reference to the following Examples, which, however, are not intended to restrict the scope of the present invention.

Example 1

(a) Production of Polymer Compound Having Repetitive Units of the Structure of General Formula (1)—Reaction of Compound of General Formula (2) with Hydroxyl Group-Having Carboxylic Acid:

52.0 g of Compound (2-1) was mixed and reacted with 26.0 g of Compound (3-1) at the reflux temperature of the mixture for 10 hours. After the reaction, the volatile components were evaporated away from the reaction mixture at 150° C. under 5 mmHg (667 Pa), and 37.0 g of a colorless liquid polymer compound (Si-1) having repetitive units of the structure of (A-1) was obtained.

Other polymer compounds (Si-2) to (Si-6) were produced in the same manner as (Si-1) above, for which, however, the compound of general formula (2) and the hydroxyl group-having carboxylic acid were varied as in Table 1 below.

TABLE 1

| Sample No. | Compound of formula (2) (its amount used), or Polymer Compound having repetitive units of the structure of formula (4) (its amount used) | Compound of formula (3) (its amount used), or Compound of formula (5) (its amount used) | Yield of Product (repetitive units) | Remarks |
|---|---|---|---|---|
| Si-1 | 2-1 (52.0 g) | 3-1 (26.0 g) | 37.0 g (A-1) | Example of the invention |
| Si-2 | 2-1 (52.0 g) | 3-3 (35.5 g) | 41.0 g (A-7) | Example of the invention |
| Si-3 | 2-1 (52.0 g) | 3-6 (60.6 g) | 55.0 g (A-6) | Example of the invention |
| Si-4 | 2-1 (52.0 g) | 3-7 (64.0 g) | 60.0 g (A-8) | Example of the invention |
| Si-5 | 2-2 (41.7 g) | 3-1 (15.2 g) | 23.0 g (A-2) | Example of the invention |
| Si-6 | 2-3 (22.0 g) | 3-1 (7.6 g) | 13.0 g (A-3) | Example of the invention |
| Si-7 | 4-1 (5.3 g) | 5-1 (4.5 g) | 3 g (A-1) | Example of the invention |
| Si-8 | 4-1 (5.3 g) | 5-6 (9.5 g) | 7 g (A-6) | Example of the invention |
| Si-9 | 2-1 (15.2 g) | A (6.0 g), B (3.2 g)(*1) | 1.3 g(*2) | Comparative Example |

*1: A is acetic acid, and B is methanol.
*2: repetitive units,

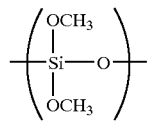

(b) Production of Poly(Dimethoxysiloxane):

15.2 g of Compound (2-1), 6 g of acetic acid and 3.2 g of methanol were mixed and reacted at the reflux temperature of the mixture for 10 hours. After the reaction, the volatile components were evaporated away from the reaction mixture at 150° C. under 5 mmHg (667 Pa), and 1.3 g of a comparative, colorless liquid polymer (Si-9) was obtained.

(c) Production of Polymer Compound Having Repetitive Units of the Structure of (1)—Reaction of Polymer Compound Having Repetitive Units of the Structure of General Formula (4) with Compound of General Formula (5):

5.3 g of poly(dimethoxysiloxane) was mixed and reacted with 4.5 g of Compound (5-1) at the reflux temperature of the mixture for 10 hours. After the reaction, the volatile components were evaporated away from the reaction mixture at 150° C. under 5 mmHg (667 Pa), and 3 g of a colorless liquid polymer compound (Si-7) was obtained.

7 g of a colorless liquid polymer compound (Si-8) was produced in the same manner as in (Si-7) above, for which, however, 9.5 g of Compound (5-6) was used in place of Compound (5-1).

(d) Preparation of Electrolyte Composition:

A mixture of 16 g of the compound (Si-1) of the present invention and 7 g of N-lithiotrifluoromethanesulfonimide ($LiNTf_2$) was dissolved in acetonitrile (10 ml). Then, acetonitrile was evaporated away from the solution under reduced pressure to obtain an electrolyte composition (SiE-1).

(SiE-2) to (SiE-15) were produced in the same manner as in (SiE-1) above, for which, however, the polymer compound having repetitive units of the structure of general formula (1) and the metal ion salt were varied as in Table 2 below.

TABLE 2

| Electrolyte Composition No. | Silicon Compound (its amount used) | Metal Ion Salt (its amount used) | Li Ion Transport | Remarks |
|---|---|---|---|---|
| SiE-1 | Si-1 (16 g) | $LiNTf_2$ (7 g) | 0.9 | Example of the invention |
| SiE-2 | Si-1 (16 g) | $LiClO_4$ (2.6 g) | 0.9 | Example of the invention |
| SiE-3 | Si-1 (16 g) | $LiPF_6$ (3.7 g) | 0.8 | Example of the invention |
| SiE-4 | Si-1 (16 g) | $LiBF_4$ (2.3 g) | 0.7 | Example of the invention |
| SiE-5 | Si-2 (20 g) | $LiNTf_2$ (7 g) | 0.7 | Example of the invention |
| SiE-6 | Si-3 (34 g) | $LiNTf_2$ (7 g) | 0.6 | Example of the invention |
| SiE-7 | Si-4 (35 g) | $LiNTf_2$ (7 g) | 0.8 | Example of the invention |
| SiE-8 | Si-5 (22 g) | $LiNTf_2$ (7 g) | 0.8 | Example of the invention |
| SiE-9 | Si-6 (22 g) | $LiNTf_2$ (7 g) | 0.8 | Example of the invention |
| SiE-10 | Si-7 (1.6 g) | $LiNTf_2$ (0.7 g) | 0.9 | Example of the invention |
| SiE-11 | Si-8 (3.4 g) | $LiNTf_2$ (0.7 g) | 0.8 | Example of the invention |
| SiE-12 | Si-9 (1.6 g) | $LiNTf_2$ (0.7 g) | 0.3 | Comparative Example |
| SiE-13 | PEGDME (16 g) | $LiNTf_2$ (7 g) | 0.1 | Comparative Example |
| SiE-14 | PEO (22 g) | $LiNTf_2$ (8.5 g) | 0.1 | Comparative Example |
| SiE-15 | PDS | | | |

PEGDME: polyethylene glycol dimethyl ether (mean molecular weight, 600)

PEO: 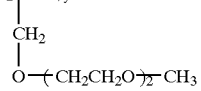

PDS: polydimethylsiloxane

Example 2

(a) Preparation of Solid Electrolyte:

10 g of the electrolyte composition (SiE-1) produced in Example 1 was mixed with 0.5 g of a nucleating agent, Compound d. The resulting mixture was cast onto a Teflon base, and heated in an argon gas atmosphere at 100° C. for 4 hours to form a solid electrolyte film (SPE-1) thereon.

Other solid electrolyte films (SPE-2) to (SPE-13) were formed in the same manner as above, for which, however, the electrolyte composition and the nucleating agent were varied as in Table 3 below.

TABLE 3

| Sample No. | Electrolyte Composition (its amount used) | Nucleating Agent (its amount used) | Li Ion Transport | Remarks |
|---|---|---|---|---|
| SPE-1 | SiE-1 (10 g) | d (0.5 g) | 0.9 | Example of the invention |
| SPE-2 | SiE-1 (10 g) | e (1 g) | 0.9 | Example of the invention |
| SPE-3 | SiE-1 (10 g) | f (2 g) | 0.9 | Example of the invention |
| SPE-4 | SiE-1 (10 g) | j (4 g) | 0.9 | Example of the invention |
| SPE-5 | SiE-5 (10 g) | e (1 g) | 0.7 | Example of the invention |
| SPE-6 | SiE-6 (10 g) | e (1 g) | 0.6 | Example of the invention |
| SPE-7 | SiE-7 (10 g) | e (1 g) | 0.7 | Example of the invention |
| SPE-8 | SiE-8 (10 g) | e (1 g) | 0.8 | Example of the invention |
| SPE-9 | SiE-9 (10 g) | e (1 g) | 0.7 | Example of the invention |
| SPE-10 | SiE-10 (10 g) | e (1 g) | 0.9 | Example of the invention |
| SPE-11 | SiE-11 (10 g) | e (1 g) | 0.8 | Example of the invention |
| SPE-12 | SiE-12 (10 g) | e (0.1 g) | 0.3 | Comparative Example |
| SPE-13 | SiE-14 | no | 0.1 | Comparative Example |

<Determination of Ion Transport>

Each electrolyte produced in Examples 1 and 2 was sandwiched between two lithium electrodes via a 0.5 mm-thick polypropylene spacer, and the Li ion transport through the structure was determined according to a method of measuring DC polarization and to a method of measuring complex impedance. The data are given in Tables 2 and 3.

As in Tables 2 and 3, the electrolytes comprising the compound of the invention achieved higher Li ion transport than the comparative electrolytes. This confirms the usefulness of the electrolytes of the present invention for lithium ion-conductive materials.

Example 3

(a) Fabrication of Cylinder Cells:

<1> Preparation of Positive Electrode Mixture Paste:

200 g of a positive electrode active material, $LiCoO_2$ was mixed with 10 g of acetylene black in a homogenizer. This was further mixed and kneaded with binders, 8 g of an aqueous dispersion of 2-ethylhexyl acrylate/acrylic acid/acrylonitrile copolymer (solid content: 50% by weight) and 60 g of aqueous 2 wt. % carboxymethyl cellulose solution. 50 g of water was added to this, and further stirred and mixed in the homogenizer to prepare a positive electrode mixture paste.

<2> Preparation of Negative Electrode Mixture Paste:

200 g of a negative electrode active material, $SnGe_{0.1}B_{0.5}P_{0.58}Mg_{0.1}K_{0.1}O_{3.35}$ was mixed with 30 g of an electroconductive agent (artificial graphite) in a homogenizer. This was further mixed with binders, 50 g of aqueous 2 wt. % carboxymethyl cellulose solution and 10 g of polyvinylidene fluoride. 30 g of water was added to this, and further kneaded and mixed to prepare a negative electrode mixture paste.

<3> Fabrication of Positive and Negative Electrode Sheets:

Using a blade coater, the positive electrode mixture paste prepared in the above was applied onto both surfaces of a 30 μm-thick aluminium leaf collector in such a manner that its amount could be 400 g/m² and the thickness of the resulting sheet could be 280 μm after compressed. After being dried, this was shaped under compression with a roller presser, and cut into strips of a predetermined size. The positive electrode sheet thus fabricated was well dewatered and dried by exposing it to a far-IR heater in a dry box (filled with dry air having a dew point of not higher than −50° C.).

In the same manner as in the fabrication of the positive electrode sheet as above, the negative electrode mixture paste was applied onto a 20 μm-thick copper leaf collector to fabricate a negative electrode sheet. The amount of the paste coat was 70 g/m², and the thickness of the sheet was 90 μm after compressed.

<4> Fabrication of Cylinder Cells:

Cell fabrication is described with reference to FIG. 1. The positive electrode sheet prepared in the above, a 30 μm-thick sheet of non-woven fabric, TAPYRUS P22FW-OCS (by Tonen Tapyrus), the negative electrode sheet prepared in the above, and another 30 μm-thick non-woven fabric, TAPYRUS P22FW-OCS (by Tonen Tapyrus) were laminated in that order, and the resulting laminate was coiled up.

The coiled electrode group 2 was cased in a bottomed, cylindrical cell casing 1 of nickel-plated iron. The cell casing 1 serves as a negative electrode terminal. With that, the electrolyte SiE-1 was introduced into the cell casing at 70° C. under reduced pressure. Then, an upper insulating plate 3 was forced into the cell casing.

A laminate structure comprising a positive electrode terminal 6, an insulating ring, a PTC device 63, a current block device 62 and a pressure sensor valve 61 was integrated with the cell casing via a caulking gasket 5 to complete a cylinder cell D-1.

Other cylinder cells D-2 to D-13 were fabricated in the same manner as in the cylinder cell D-1 above, for which, however, used were different electrolytes as in Table 4 below. 10 samples of each type of cell were fabricated.

Still other cylinder cells D-14 to D-20 were fabricated also in the same manner as in the cylinder cell D-1 above, for which, however, used was graphite powder for the negative electrode active material.

(b) Evaluation of Cell Properties:

Each sample of the cells fabricated in the above was subjected to 10 charge-discharge cycles at 0.2 C. In every cycle, the end point of the charge voltage was 4.1 V and that of the discharge voltage was 2.7 V. In the last cycle 10, the discharge capacity of the sample cell tested was measured. Each of 10 samples of one and the same type of cell was tested under the same condition as above, and the data of all the tested samples of each type of cell were averaged. This indicates the capacity of each type of cell. In that manner, the cell capacity of each cell was obtained, and this was divided by the cell capacity of D-1 to obtain the relative capacity of each cell. The data are given in Table 4.

TABLE 4

| Cell No. | Electrolyte Composition (its amount used) | Relative Capacity | Remarks |
|---|---|---|---|
| D-1 | SiE-1 | 1.0 | Example of the invention |
| D-2 | SiE-2 | 1.0 | Example of the invention |
| D-3 | SiE-3 | 0.98 | Example of the invention |
| D-4 | SiE-4 | 0.72 | Example of the invention |
| D-5 | SiE-5 | 0.75 | Example of the invention |
| D-6 | SiE-6 | 0.40 | Example of the invention |
| D-7 | SiE-7 | 0.83 | Example of the invention |
| D-8 | SiE-8 | 0.85 | Example of the invention |
| D-9 | SiE-9 | 0.88 | Example of the invention |
| D-10 | SiE-10 | 1.0 | Example of the invention |
| D-11 | SiE-11 | 0.98 | Example of the invention |
| D-12 | SiE-12 | 0.17 | Comparative Example |
| D-13 | SiE-13 | 0.08 | Comparative Example |
| D-14 | SiE-1 | 0.80 | Example of the invention |
| D-15 | SiE-2 | 0.80 | Example of the invention |
| D-16 | SiE-3 | 0.78 | Example of the invention |
| D-17 | SiE-7 | 0.69 | Example of the invention |
| D-18 | SiE-9 | 0.72 | Example of the invention |
| D-19 | SiE-12 | 0.14 | Comparative Example |
| D-20 | SiE-13 | 0.06 | Comparative Example |

From the data in Table 4 above, it is understood that the capacity of the cells comprising the electrolyte composition of the invention is large.

Cells that differ from those fabricated herein only in that $LiNiO_2$ or $LiMnO_2$ was used for the positive electrode active material produced the same results as herein.

Example 4

(a) Fabrication of Sheet Cells:

<1> Fabrication of Positive Electrode Sheet 1:

43 parts by weight of a positive electrode active material, $LiCoO_2$, 2 parts by weight of flaky graphite, 2 parts by weight of acetylene black, and 3 parts by weight of a binder, polyacrylonitrile were kneaded along with 100 parts by weight of a medium, acrylonitrile to prepare a slurry. Using an extrusion coater, the slurry was applied onto 20 μm-thick aluminium leaf. After being dried, this was shaped under compression with a calender presser, and an aluminium lead plate was welded to its edge to construct a positive electrode sheet (CA-1) having a thickness of 95 μm, a width of 54 mm and a length of 49 mm.

<2> Fabrication of Positive Electrode Sheet 2:

43 parts by weight of a positive electrode active material, $LiMn_2O_4$, 2 parts by weight of flaky graphite, 2 parts by weight of acetylene black, and 3 parts by weight of a binder, polyacrylonitrile were kneaded along with 100 parts by weight of a medium, acrylonitrile to prepare a slurry. Using an extrusion coater, the slurry was applied onto 20 μm-thick aluminium leaf. After being dried, this was shaped under compression with a calender presser, and an aluminium lead plate was welded to its edge to construct a positive electrode sheet (CA-2) having a thickness of 114 μm, a width of 54 mm and a length of 49 mm.

<3> Fabrication of Positive Electrode Sheet 3:

43 parts by weight of a positive electrode active material, $LiNiO_2$, 2 parts by weight of flaky graphite, 2 parts by weight of acetylene black, and 3 parts by weight of a binder, polyacrylonitrile were kneaded along with 100 parts by weight of a medium, acrylonitrile to prepare a slurry. Using an extrusion coater, the slurry was applied onto 20 μm-thick aluminium leaf. After being dried, this was shaped under compression with a calender presser, and an aluminium lead plate was welded to its edge to construct a positive electrode sheet (CA-3) having a thickness of 75 μm, a width of 54 mm and a length of 49 mm.

<4> Fabrication of Negative Electrode Sheet 1:

43 parts by weight of a negative electrode active material, $SnSiO_3$, a mixture of electroconductive agents, 2 parts by weight of acetylene black and 2 parts by weight of graphite, and 3 parts by weight of a binder, polyacrylonitrile were kneaded along with 100 parts by weight of a medium, N-methylpyrrolidone to prepare a negative electrode mixture slurry.

On the other hand, 45 parts by weight of α-alumina, 7 parts by weight of graphite, 3 parts by weight of polyacrylonitrile and 100 parts by weight of N-methylpyrrolidone were mixed to prepare a slurry for auxiliary layer.

Using an extrusion coater, the negative electrode mixture slurry and the auxiliary layer slurry were applied onto 10 μm-thick copper leaf, the former forming the lower layer and the latter forming the upper layer. After being dried, this was shaped under compression with a calender presser to construct a negative electrode sheet having a thickness of 46 μm, a width of 55 mm and a length of 50 mm.

A nickel lead plate was welded to the edge of the negative electrode sheet, and then heated in dry air (having a dew point of not higher than −40° C.) at 230° C. for 1 hour. For the heat treatment, used was a far-IR heater. Lithium leaf (purity: 99.8%) having a thickness of 35 μm and cut to have a size of 4 mm×55 mm was stuck onto the entire surface of the heat-treated negative electrode sheet, at regular intervals of 10 mm in the direction perpendicular to the machine direction of the sheet (AN-1).

<5> Fabrication of Negative Electrode Sheets 2:

In the same manner as in <4>, other negative electrode sheets (AN-2) and (AN-3) each having a width of 55 mm and a length of 50 mm and having a nickel lead plate welded to their edge and coated with lithium foil were fabricated, for which, however, $Sn_{0.8}Al_{0.2}B_{0\ 3}P_{0.2}Si_{0.5}O_{3.6}$ and $SnAl_{0.4}B_{0.5}Cs_{0.1}P_{0.5}O_{3.65}$, respectively, were used in place of $SnSiO_3$.

<6> Fabrication of Negative Electrode Sheet 3:

43 parts by weight of a negative electrode active material, mesophase pitch carbon (by Petoca), a mixture of electroconductive agents, 2 parts by weight of acetylene black and 2 parts by weight of graphite, and 3 parts by weight of a binder, polyacrylonitrile were kneaded along with 100 parts by weight of a medium, N-methylpyrrolidone to prepare a negative electrode mixture slurry.

Using an extrusion coater, the negative electrode mixture slurry was applied onto 10 μm-thick copper leaf. After being dried, this was shaped under compression with a calender presser to construct a negative electrode sheet having a thickness of 46 μm, a width of 55 mm and a length of 50 mm. A nickel lead plate was welded to the edge of the negative electrode sheet, and then heated in dry air (having a dew point of not higher than −40° C.) at 230° C. for 1 hour (AN-4). For the heat treatment, used was a far-IR heater.

Figure 2:
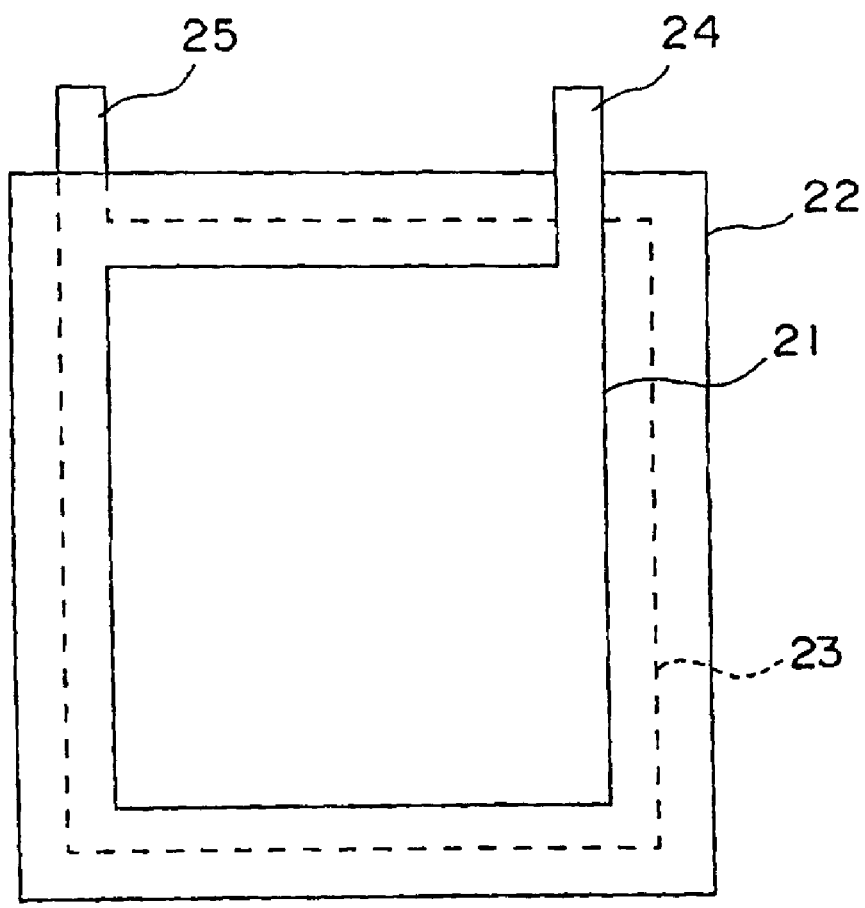
FIG. 2 is a conceptual view of a sheet cell fabricated in Examples herein.

<7> Fabrication of Sheet Cells:

Sheet cell fabrication is described with reference to FIG. 2.

The negative electrode sheet and the positive electrode sheet were separately dewatered and dried in dry air (having a dew point of not higher than −40° C.) at 230° C. for 30 minutes. In a dry atmosphere, the dewatered dry positive electrode sheet (CA-1) 21 having a width of 54 mm and a length of 49 mm, a solid electrolyte 22 having a width of 60 mm, a length of 60 mm and a thickness of 30 μm, and the dewatered dry negative electrode sheet (AN-1) 23 were laminated in that order; and the four edges of the resulting laminate structure were heat-sealed with a casing of a laminate film of polyethylene (50 μm)-polyethylene terephthalate (50 μm), in vacuum to fabricate a sheet cell (SB-1) as in Table 5 below.

In the same manner as in the sheet cell (SB-1) above, other sheet cells (SB-2) to (SB-16) were fabricated as in Table 5.

capacity of SB-13 was divided by that of SB-7; the capacity of SB-14 was divided by that of SB-8; the capacity of SB-15 was divided by that of SB-9; and the capacity of SB-16 was divided by that of SB-10. As a result, the relative capacity of each cell in the same group having the same type of electrolyte composition was thus obtained. The data are given in Table 5.

From the data as above, it is understood that the capacity of the cells comprising the electrolyte composition of the invention is larger than that of the comparative cells.

Example 5

(a) Production of Silicon Polymer—Reaction of Compound of General Formula (13) with Hydroxyl Group-Having Carboxylic Acid:

52.0 g of Compound (2'-1) was mixed and reacted with 26.0 g of Compound (3-1) at the reflux temperature of the

TABLE 5

| Cell No. | Positive Electrode Sheet | Negative Electrode Sheet | Solid Electrolyte | Relative Capacity | Remarks |
| --- | --- | --- | --- | --- | --- |
| SB-1 | CA-1 | AN-1 | SPE-1 | 1.0 | Example of the invention |
| SB-2 | CA-1 | AN-1 | SPE-2 | 1.0 | Example of the invention |
| SB-3 | CA-1 | AN-1 | SPE-3 | 1.0 | Example of the invention |
| SB-4 | CA-1 | AN-1 | SPE-5 | 0.75 | Example of the invention |
| SB-5 | CA-1 | AN-1 | SPE-10 | 1.0 | Example of the invention |
| SB-6 | CA-1 | AN-2 | SPE-2 | 1.0 | Example of the invention |
| SB-7 | CA-1 | AN-3 | SPE-2 | 1.0 | Example of the invention |
| SB-8 | CA-1 | AN-4 | SPE-2 | 1.0 | Example of the invention |
| SB-9 | CA-2 | AN-1 | SPE-2 | 1.0 | Example of the invention |
| SB-10 | CA-3 | AN-1 | SPE-2 | 1.0 | Example of the invention |
| SB-11 | CA-1 | AN-1 | SPE-13 | 0.08 | Comparative Example |
| SB-12 | CA-1 | AN-2 | SPE-13 | 0.08 | Comparative Example |
| SB-13 | CA-1 | AN-3 | SPE-13 | 0.08 | Comparative Example |
| SB-14 | CA-1 | AN-4 | SPE-13 | 0.07 | Comparative Example |
| SB-15 | CA-2 | AN-1 | SPE-13 | 0.08 | Comparative Example |
| SB-16 | CA-3 | AN-1 | SPE-13 | 0.08 | Comparative Example |

(b) Evaluation of Cell Properties:

Each sample of the sheet cells fabricated in the above was subjected to 10 charge-discharge cycles at 0.2 C. In every cycle, the end point of the charge voltage was 4.2 V and that of the discharge voltage was 2.6 V. In the last cycle 10, the discharge capacity of the sample cell tested was measured. Each of 10 samples of one and the same type of cell was tested under the same condition as above, and the data of all the tested samples of each type of cell were averaged. This indicates the capacity of each type of cell. In that manner, the cell capacity of each cell was obtained. The capacity of the cells SB-2 to SB-5 and SB-11 was divided by that of the cell SB-1; the capacity of SB-12 was divided by that of SB-6; the mixture for 10 hours. After the reaction, the volatile components were evaporated away from the reaction mixture at 150° C. under 5 mmHg (667 Pa), and 37.0 g of a silicon polymer (Si-1) having repetitive units of the structure of (A'-1) was obtained.

Other polymer compounds (Si-2) to (Si-6) were produced in the same manner as in (Si-1) above, for which, however, the compound of general formula (13) and the hydroxyl group-having carboxylic acid were varied as in Table 6 below. (Si-1) to (Si-6) are the same as those produced in Example 1.

TABLE 6

| Sample No. | Compound of formula (13) (its amount used), or Polymer having repetitive units of the structure of formula (15) (its amount used) | Compound of formula (14) (its amount used), or Compound of formula (16) (its amount used) | Yield of Product (repetitive units) |
| --- | --- | --- | --- |
| Si-1 | 2'-1 (52.0 g) | 3-1 (26.0 g) | 37.0 g (A'-1) |
| Si-2 | 2'-1 (52.0 g) | 3-3 (35.5 g) | 41.0 g (A'-7) |
| Si-3 | 2'-1 (52.0 g) | 3-6 (60.6 g) | 55.0 g (A'-6) |
| Si-4 | 2'-1 (52.0 g) | 3-7 (64.0 g) | 60.0 g (A'-8) |
| Si-5 | 2'-2 (41.7 g) | 3-1 (15.2 g) | 23.0 g (A'-2) |
| Si-6 | 2'-3 (22.0 g) | 3-1 (7.6 g) | 13.0 g (A'-3) |
| Si-7 | 4-1 (5.3 g) | 5-1 (4.5 g) | 3 g (A'-1) |
| Si-8 | 4-1 (5.3 g) | 5-6 (9.5 g) | 7 g (A'-6) |

(b) Production of Silicon Polymer—Reaction of Silicon Polymer Having Repetitive Units of the Structure of General Formula (15) with Alcohol Compound of (16):

5.3 g of poly(dimethoxysiloxane) was mixed and reacted with 4.5 g of Compound (5-1) at the reflux temperature of the mixture for 10 hours. After the reaction, the volatile components were evaporated away from the reaction mixture at 150° C. under 5 mmHg (667 Pa), and 3 g of a colorless liquid polymer (Si-7) was obtained. 7 g of a colorless liquid polymer (Si-8) was produced in the same manner as above, for which, however, 9.5 g of Compound (5-6) was used in place of Compound (5-1). (Si-7) and (Si-8) are the same as those produced in Example 1.

(c) Preparation of Electrolyte Composition:

A mixture of 5 g of a molten salt, Compound (Y2-3), 16 g of Compound (Si-1), and 7 g of N-lithiotrifluoromethanesulfonimide (LiNTf$_2$) was dissolved in acetonitrile (10 ml). Then, acetonitrile was evaporated away from the solution under reduced pressure to obtain an electrolyte composition (SiE-16).

(SiE-17) to (SiE-31) were produced in the same manner as in (SiE-16) above, for which, however, the molten salt, the silicon polymer and the metal ion salt were varied as in Table 7 below.

TABLE 7

| Electrolyte Composition No. | Molten salt (its amount) used) | Silicon Polymer (its amount) used) | Metal Ion Salt (its amount) used) | Ionic Conductivity (S/cm) | Li Ion Transport | Remarks |
| --- | --- | --- | --- | --- | --- | --- |
| SiE-16 | Y2-3 (5 g) | Si-1 (16 g) | LiNTF$_2$ (7 g) | 1 × 10$^{-4}$ | 0.9 | Example of the invention |
| SiE-17 | Y6-2 (5 g) | Si-1 (16 g) | LiNTF$_2$ (7 g) | 1.0 × 10$^{-4}$ | 0.9 | Example of the invention |
| SiE-18 | Y6-2 (5 g) | Si-1 (16 g) | LiPF$_6$ (3.7 g) | 1.0 × 10$^{-4}$ | 0.8 | Example of the invention |
| SiE-19 | Y6-2 (5 g) | Si-1 (16 g) | LiBF$_4$ (2.3 g) | 0.9 × 10$^{-4}$ | 0.7 | Example of the invention |
| SiE-20 | Y6-3 (5 g) | Si-1 (16 g) | LiNTF$_2$ (7 g) | 0.8 × 10$^{-4}$ | 0.7 | Example of the invention |
| SiE-21 | Y6-3 (5 g) | Si-2 (20 g) | LiNTF$_2$ (7 g) | 1.0 × 10$^{-4}$ | 0.7 | Example of the invention |
| SiE-22 | Y6-3 (5 g) | Si-3 (34 g) | LiNTF$_2$ (7 g) | 1.0 × 10$^{-4}$ | 0.6 | Example of the invention |
| SiE-23 | Y6-3 (5 g) | Si-4 (35 g) | LiNTF$_2$ (7 g) | 1.0 × 10$^{-4}$ | 0.8 | Example of the invention |
| SiE-24 | Y6-3 (5 g) | Si-5 (22 g) | LiNTF$_2$ (7 g) | 1.0 × 10$^{-4}$ | 0.8 | Example of the invention |
| SiE-25 | Y6-3 (5 g) | Si-6 (22 g) | LiNTF$_2$ (7 g) | 1.0 × 10$^{-4}$ | 0.8 | Example of the invention |
| SiE-26 | Y6-3 (5 g) | Si-7 (1.6 g) | LiNTF$_2$ (0.7 g) | 1.0 × 10$^{-4}$ | 0.9 | Example of the invention |
| SiE-27 | Y6-3 (5 g) | Si-8 (3.4 g) | LiNTF$_2$ (0.7 g) | 1.0 × 10$^{-4}$ | 0.8 | Example of the invention |
| SiE-28 | Y17-3 (5 g) | Si-1 (16 g) | LiNTF$_2$ (7 g) | 1.0 × 10$^{-4}$ | 0.8 | Example of the invention |
| SiE-29 | Y6-3 (5 g) | PDMS (16 g) | LiNTF$_2$ (7 g) | 0.8 × 10$^{-4}$ | 0.6 | Example of the invention |
| SiE-30 | Y6-3 (21 g) | no | LiNTF$_2$ (7 g) | 1.2 × 10$^{-4}$ | 0.1 | Comparative Example |
| SiE-31 | no | Si-1 (16 g) | LiNTF$_2$ (7 g) | 0.5 × 10$^{-4}$ | 0.9 | Comparative Example |

PDMS: poly(dimethoxysiloxane)

Example 6

(a) Preparation of Solid Electrolyte:

10 g of the electrolyte composition (SiE-16) produced in Example 5 was mixed with 0.5 g of a nucleating agent, Compound d. The resulting mixture was cast onto a Teflon base, and heated in an argon gas atmosphere at 100° C. for 4 hours to form a solid electrolyte thin film (SPE-14) thereon.

In the same manner as above, other solid electrolyte thin films (SPE-15) to (SPE-26) were formed as in Table 8 below.

TABLE 8

| Sample No. | Electrolyte Composition (its amount used) | Nucleating Agent (its amount used) | Ionic Conductivity (S/cm) | Li Ion Transport | Remarks |
| --- | --- | --- | --- | --- | --- |
| SPE-14 | SiE-16 (10 g) | d (0.5 g) | 0.9 × 10$^{-4}$ | 0.9 | Example of the invention |
| SPE-15 | SiE-17 (10 g) | e (1 g) | 0.9 × 10$^{-4}$ | 0.9 | Example of the invention |
| SPE-16 | SiE-18 (10 g) | f (2 g) | 0.6 × 10$^{-4}$ | 0.9 | Example of the invention |
| SPE-17 | SiE-18 (10 g) | j (4 g) | 0.8 × 10$^{-4}$ | 0.9 | Example of the invention |
| SPE-18 | SiE-20 (10 g) | e (1 g) | 0.9 × 10$^{-4}$ | 0.7 | Example of the invention |
| SPE-19 | SiE-21 (10 g) | e (1 g) | 0.9 × 10$^{-4}$ | 0.6 | Example of the invention |
| SPE-20 | SiE-22 (10 g) | e (1 g) | 0.9 × 10$^{-4}$ | 0.7 | Example of the invention |
| SPE-21 | SiE-23 (10 g) | e (1 g) | 0.9 × 10$^{-4}$ | 0.8 | Example of the invention |
| SPE-22 | SiE-24 (10 g) | e (1 g) | 0.9 × 10$^{-4}$ | 0.7 | Example of the invention |
| SPE-23 | SiE-25 (10 g) | e (1 g) | 0.9 × 10$^{-4}$ | 0.9 | Example of the invention |
| SPE-24 | SiE-28 (10 g) | e (1 g) | 0.9 × 10$^{-4}$ | 0.8 | Example of the invention |
| SPE-25 | SiE-29 (10 g) | d (0.5 g) | 0.7 × 10$^{-4}$ | 0.5 | Example of the invention |
| SPE-26 | SiE-31 (10 g) | d (0.5 g) | 0.7 × 10$^{-5}$ | 0.8 | Comparative Example |

<Measurement of Ionic Conductivity and Ion Transport>

Each electrolyte composition produced in Examples 5 and 6 was sandwiched between two lithium electrodes via a 0.5 mm-thick polypropylene spacer, and the impedance of the thus-constructed sample was measured at 0.1 to 100,000 Hz, from which was derived the ionic conductivity of the sample through Cole-Cole plot. In addition, the Li ion transport in the sample was determined through combination of DC polarization measurement and complex impedance measurement as above. The data are given in Tables 7 and 8.

As in Tables 7 and 8, the electrolyte compositions comprising the compound of the present invention achieved higher Li ion transport than the comparative electrolytes, detracting little from the ionic conductivity through them. This confirms the usefulness of the electrolyte compositions of the present invention for lithium ion-conductive materials.

Example 7

(a) Fabrication of Cylinder Cells:

In the same manner as in the cylinder cell D-1 in Example 3, a cylinder cell D-21 was fabricated, for which, however, the electrolyte SiE-16 prepared in Example 5 was used in place of the electrolyte SiE-1 used in Example 3.

Other cylinder cells D-22 to D-35 were fabricated also in the same manner, but using the electrolyte composition as in Table 7. 10 samples of every type of cell were fabricated in that manner.

Still other cylinder cells D-36 to D-45 were fabricated also in the same manner as in the cylinder cells D-21 to D-45 above, for which, however, used was graphite powder for the negative electrode active material.

(b) Evaluation of Cell Properties:

Each sample of the cells fabricated in the above was subjected to 10 charge-discharge cycles at 0.2 C. In every cycle, the end point of the charge voltage was 4.1 V and that of the discharge voltage was 2.7 V. In the last cycle 10, the discharge capacity of the sample cell tested was measured. Each of 10 samples of one and the same type of cell was tested under the same condition as above, and the data of all the tested samples of each type of cell were averaged. This indicates the capacity of each type of cell. In that manner, the cell capacity of each cell was obtained, and this was divided by the cell capacity of D-21 to obtain the relative capacity of each cell. In addition, each cell sample was subjected to further charge-discharge cycles at 0.5 C (charge voltage end point: 4.1 V, discharge voltage end point: 2.7 V), and its discharge capacity in cycle 100 was obtained. This was compared with that in cycle 10, and the ratio indicates the cycle capacity of the sample cell tested. The data are given in Table 9.

TABLE 9

| Cell No. | Electrolyte | Relative Capacity | Cycle Capacity | Remarks |
| --- | --- | --- | --- | --- |
| D-21 | SiE-16 | 1 | 0.93 | Example of the invention |
| D-22 | SiE-17 | 1 | 0.93 | Example of the invention |
| D-23 | SiE-18 | 0.96 | 0.92 | Example of the invention |
| D-24 | SiE-19 | 0.87 | 0.92 | Example of the invention |
| D-25 | SiE-20 | 0.83 | 0.91 | Example of the invention |
| D-26 | SiE-21 | 0.90 | 0.92 | Example of the invention |
| D-27 | SiE-22 | 0.65 | 0.91 | Example of the invention |
| D-28 | SiE-23 | 0.95 | 0.91 | Example of the invention |
| D-29 | SiE-24 | 0.95 | 0.91 | Example of the invention |
| D-30 | SiE-25 | 0.95 | 0.91 | Example of the invention |
| D-31 | SiE-26 | 1 | 0.91 | Example of the invention |
| D-32 | SiE-27 | 0.95 | 0.94 | Example of the invention |
| D-33 | SiE-28 | 0.95 | 0.93 | Example of the invention |
| D-34 | SiE-30 | 0.25 | 0.90 | Comparative Example |
| D-35 | SiE-31 | 0.54 | 0.91 | Comparative Example |
| D-36 | SiE-17 | 0.92 | 0.92 | Example of the invention |
| D-37 | SiE-18 | 0.88 | 0.90 | Example of the invention |
| D-38 | SiE-23 | 0.82 | 0.90 | Example of the invention |
| D-39 | SiE-24 | 0.82 | 0.90 | Example of the invention |
| D-40 | SiE-25 | 0.82 | 0.90 | Example of the invention |
| D-41 | SiE-26 | 0.92 | 0.91 | Example of the invention |
| D-42 | SiE-27 | 0.87 | 0.90 | Example of the invention |
| D-43 | SiE-28 | 0.86 | 0.92 | Example of the invention |
| D-44 | SiE-30 | 0.23 | 0.91 | Comparative Example |
| D-45 | SiE-31 | 0.50 | 0.90 | Comparative Example |

From the data in Table 9 above, it is obvious that the cells comprising the electrolyte composition of the present invention have improved cycle stability with no reduction in the cell capacity. In addition, the data confirm that the cycle stability of the cells in which the negative electrode is formed of an amorphous composite oxide is better than that of the cells in which the negative electrode is formed of a carbonaceous material. On the other hand, it is obvious that the cells comprising a conventional electrolyte composition are not good in point of the cell capacity and the cycle stability.

Cells that differ from those fabricated herein only in that $LiNiO_2$ or $LiMnO_2$ was used for the positive electrode active material produced the same results as herein.

Example 8

(a) Fabrication of Sheet Cells:

Sheet cell fabrication is described with reference to FIG. 2.

The positive electrode sheets (CA-1) to (CA-3) and the negative electrode sheets (AN-1) to (AN-4) were prepared in the same manner as in Example 4 and used.

The negative electrode sheet and the positive electrode sheet were separately dewatered and dried in dry air (having a dew point of not higher than −40° C.) at 230° C. for 30 minutes. In a dry atmosphere, the dewatered dry positive electrode sheet (CA-1) 21 having a width of 54 mm and a length of 49 mm, a thin, solid electrolyte composition film 22 having a width of 60 mm and a length of 60 mm, and the dewatered dry negative electrode sheet (AN-1) 23 were laminated in that order; and the four edges of the resulting laminate structure were heat-sealed with a casing of a laminate film of polyethylene (50 μm)-polyethylene terephthalate (50 μm), in vacuum to fabricate a sheet cell (SB-17) as in Table 10 below.

In the same manner as in the sheet cell (SB-17) above, other sheet cells (SB-18) to (SB-32) were fabricated as in Table 10.

TABLE 10

| Cell No. | Positive Electrode Sheet | Negative Electrode Sheet | Solid Electrolyte | Remarks |
| --- | --- | --- | --- | --- |
| SB-17 | CA-1 | AN-1 | SPE-14 | Example of the invention |
| SB-18 | CA-1 | AN-1 | SPE-15 | Example of the invention |
| SB-19 | CA-1 | AN-1 | SPE-17 | Example of the invention |

TABLE 10-continued

| Cell No. | Positive Electrode Sheet | Negative Electrode Sheet | Solid Electrolyte | Remarks |
|---|---|---|---|---|
| SB-20 | CA-1 | AN-1 | SPE-21 | Example of the invention |
| SB-21 | CA-1 | AN-1 | SPE-23 | Example of the invention |
| SB-22 | CA-1 | AN-2 | SPE-15 | Example of the invention |
| SB-23 | CA-1 | AN-3 | SPE-15 | Example of the invention |
| SB-24 | CA-1 | AN-4 | SPE-15 | Example of the invention |
| SB-25 | CA-2 | AN-1 | SPE-15 | Example of the invention |
| SB-26 | CA-3 | AN-1 | SPE-15 | Example of the invention |
| SB-27 | CA-1 | AN-1 | SPE-26 | Comparative Example |
| SB-28 | CA-1 | AN-2 | SPE-26 | Comparative Example |
| SB-29 | CA-1 | AN-3 | SPE-26 | Comparative Example |
| SB-30 | CA-1 | AN-4 | SPE-26 | Comparative Example |
| SB-31 | CA-2 | AN-1 | SPE-26 | Comparative Example |
| SB-32 | CA-3 | AN-1 | SPE-26 | Comparative Example |

(b) Evaluation of Cell Properties:

Each sample of the sheet cells fabricated in the above was subjected to 10 charge-discharge cycles at 0.2 C. In every cycle, the end point of the charge voltage was 4.2 V and that of the discharge voltage was 2.6 V. In the last cycle 10, the discharge capacity of the sample cell tested was measured. Each of 10 samples of one and the same type of cell was tested under the same condition as above, and the data of all the tested samples of each type of cell were averaged. This indicates the capacity of each type of cell. In that manner, the cell capacity of each cell was obtained. The capacity of the cells SB-18 to SB-21 and SB-27 was divided by that of the cell SB-17; the capacity of SB-28 was divided by that of SB-22; the capacity of SB-29 was divided by that of SB-23; the capacity of SB-30 was divided by that of SB-24; the capacity of SB-31 was divided by that of SB-25; and the capacity of SB-32 was divided by that of SB-26. As a result, the relative capacity of each cell in the same group having the same type of electrolyte composition was thus obtained. In addition, each cell sample was subjected to further charge-discharge cycles at 0.5 C (charge voltage end point: 4.2 V, discharge voltage end point: 2.6 V), and its discharge capacity in cycle 300 was obtained. This was compared with that in cycle 10, and the ratio indicates the cycle capacity of the sample cell tested. The data are given in Table 11.

TABLE 11

| Cell No. | Relative Capacity | Cycle Capacity |
|---|---|---|
| SB-17 | 1 | 0.85 |
| SB-18 | 1.02 | 0.85 |
| SB-19 | 1.01 | 0.84 |
| SB-20 | 0.98 | 0.85 |
| SB-21 | 1.01 | 0.85 |
| SB-22 | 1.03 | 0.85 |
| SB-23 | 1.03 | 0.84 |
| SB-24 | 1.03 | 0.85 |
| SB-25 | 1.03 | 0.84 |
| SB-26 | 1.03 | 0.84 |

TABLE 11-continued

| Cell No. | Relative Capacity | Cycle Capacity |
|---|---|---|
| SB-27 | 0.86 | 0.84 |
| SB-28 | 0.84 | 0.79 |
| SB-29 | 0.83 | 0.78 |
| SB-30 | 0.72 | 0.76 |
| SB-31 | 0.83 | 0.78 |
| SB-32 | 0.83 | 0.73 |

(c) Evaluation of Leak Resistance:

The casing on one surface of each sheet cell fabricated in the above was peeled off, and a pressure of 200 g/cm$^2$ was applied onto the exposed face of the cell. In that condition the cell was visually checked as to whether or not the inner liquid leaked out of the cell. In the leak test, no liquid leak was found in all the cells tested.

From the data as above, it is obvious that the sheet-type secondary cells comprising the electrolyte composition of the present invention have improved cycle stability with no reduction in the cell capacity. In addition, the data confirm that the cells are free from leak trouble.

As described in detail hereinabove with reference to its preferred embodiments, the present invention provides an excellent novel electrolyte composition of low or no fluidity that ensures high ionic conduction and ion transport, and a method for producing it, and provides a non-aqueous electrolyte secondary cell having the advantage of high cell capacity not lowering in time and the advantage of good cycle stability.

What is claimed is:

1. An electrolyte composition comprising a polymer compound including repetitive units of a structure of the following general formula (1), and a salt of a metal ion of Group 1 or 2 of the Periodic Table:

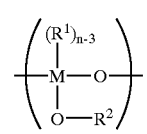

General formula (1)

wherein R$^1$ represents one of a substituted or unsubstituted alkyl group and a substituted or unsubstituted alkoxy group; R$^2$ represents a substituted or unsubstituted alkyl group; at least one of R$^1$ and O—R$^2$ includes a substituent including an alkoxycarbonyl group; M represents silicon, boron or a metal element; and n represents the valence of M.

2. The electrolyte composition according to claim 1, wherein M in general formula (1) represents silicon.

3. The electrolyte composition according to claim 1, wherein R$^1$ in general formula (1) represents a substituted or unsubstituted alkoxy group.

4. The electrolyte composition according to claim 1, wherein the polymer compound comprises a product prepared by reacting a compound of the following general formula (2), with a hydroxyl group-having carboxylic acid:

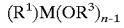

$(R^1)M(OR^3)_{n-1}$       General formula (2)

wherein R$^1$ represents one of a substituted or unsubstituted alkyl group and a substituted or unsubstituted alkoxy group; M represents silicon, boron or a metal element; n represents the valence of the element represented by M; and R$^3$ represents a substituted or unsubstituted alkyl group.

5. The electrolyte composition according to claim 1, wherein the polymer compound comprises a product prepared by reacting a polymer compound that includes repetitive units of a structure of the following general formula (4) with an alkoxycarbonyl group-having alcohol compound:

General formula (4)

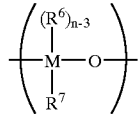

wherein $R^6$ represents one of a substituted or unsubstituted alkyl group and a substituted or unsubstituted alkoxy group; $R^7$ represents a substituted or unsubstituted alkoxy group; M represents silicon, boron or a metal element; and n represents the valence of M.

6. The electrolyte composition according to claim 5, wherein the alkoxycarbonyl group-having alcohol compound comprises an alkoxycarbonyl group-having alcohol compound represented by the following general formula (5):

General formula (5)

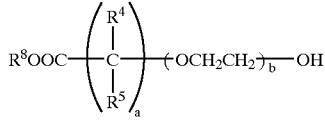

wherein $R^8$ represents a substituted or unsubstituted alkyl group; $R^4$ and $R^5$ each independently represent a hydrogen atom or an alkyl group; a represents an integer from 1 to 5; and b represents an integer from 0 to 30.

7. The electrolyte composition according to claim 6, wherein, in general formula (5), a is 1 and b is 0.

8. The electrolyte composition according to claim 6, wherein $R^4$ and $R^5$ in general formula (5) each represent a hydrogen atom.

9. The electrolyte composition according to claim 1, wherein the electrolyte composition has been crosslinked by reacting with a compound having at least two nucleophilic groups in the molecule.

10. A method for producing an electrolyte composition, the method comprising the steps of:

preparing a polymer compound including repetitive units of a structure of the following general formula (1), which includes reacting a compound of the following general formula (2) with a hydroxyl group-having carboxylic acid; and adding a salt of a metal ion of Group 1 or 2 of the Periodic Table to the polymer compound:

General formula (1)

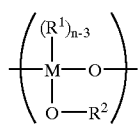

wherein, in general formula (1), $R^1$ represents one of a substituted or unsubstituted alkyl group and a substituted or unsubstituted alkoxy group; $R^2$ represents a substituted or unsubstituted alkyl group; at least one of $R^1$ and O—$R^2$ includes a substituent including an alkoxycarbonyl group; M represents silicon, boron or a metal element; and n represents the valence of M, and $(R^1)M(OR^3)_{n-1}$            General formula (2)

in general formula (2), $R^1$ represents one of a substituted or unsubstituted alkyl group and a substituted or unsubstituted alkoxy group; M represents silicon, boron or a metal element; n represents the valence of the element represented by M; and $R^3$ represents a substituted or unsubstituted alkyl group.

11. A method for producing an electrolyte composition, the method comprising the steps of:

preparing a polymer compound including repetitive units of a structure of the following general formula (1), which includes reacting a polymer compound having repetitive units of a structure of the following general formula (4), with an alkoxycarbonyl group-having alcohol compound; and adding a salt of a metal ion of Group 1 or 2 of the Periodic Table to the polymer compound:

General formula (1)

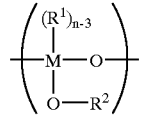

wherein, in general formula (1), $R^1$ represents one of a substituted or unsubstituted alkyl group and a substituted or unsubstituted alkoxy group; $R^2$ represents a substituted or unsubstituted alkyl group; at least one of $R^1$ and O—$R^2$ includes a substituent including an alkoxycarbonyl group; M represents silicon, boron or a metal element; and n represents the valence of M, and General formula (4)

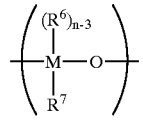

in general formula (4), $R^6$ represents one of a substituted or unsubstituted alkyl group and a substituted or unsubstituted alkoxy group; $R^7$ represents a substituted or unsubstituted alkoxy group; M represents silicon, boron or a metal element; and n represents the valence of M.

12. A non-aqueous electrolyte secondary cell comprising an electrolyte composition, a positive electrode and a negative electrode, the electrolyte composition coupling the electrodes to one another, and the electrolyte composition including a polymer compound including repetitive units of a structure of the following general formula (1), and a salt of a metal ion of Group 1 or 2 of the Periodic Table:

General formula (1)

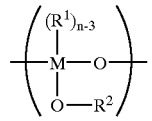

wherein $R^1$ represents one of a substituted or unsubstituted alkyl group and a substituted or unsubstituted alkoxy group; $R^2$ represents a substituted or unsubstituted alkyl group; at least one of $R^1$ and O—$R^2$ includes a substituent including an alkoxycarbonyl group; M represents silicon, boron or a metal element; and n represents the valence of M.

* * * * *